United States Patent
Hijikata et al.

(10) Patent No.: US 9,887,656 B2
(45) Date of Patent: Feb. 6, 2018

(54) INFORMATION PROCESSING DEVICE, INFORMATION STORAGE DEVICE, AND CONTROL DEVICE OF ROTARY ELECTRIC MACHINE

(71) Applicants: KABUSHIKI KAISHA TOYOTA CHUO KENKYUSHO, Nagakute-shi, Aichi-ken (JP); TOYOTA JIDOSHA KABUSHIKI KAISHA, Toyota-shi, Aichi-ken (JP); AISIN SEIKI KABUSHIKI KAISHA, Kariya-shi, Aichi-ken (JP)

(72) Inventors: Wataru Hijikata, Nagakute (JP); Takao Watanabe, Nagakute (JP); Eiji Tsuchiya, Nagakute (JP); Shohei Matsumoto, Kariya (JP); Masahide Uemura, Susono (JP); Akira Murakami, Gotenba (JP); Tomoyuki Tohyama, Chita (JP)

(73) Assignees: KABUSHIKI KAISHA TOYOTA CHUO KENKYUSHO, Nagakute-shi (JP); TOYOTA JIDOSHA KABUSHIKI KAISHA, Toyota (JP); AISIN SEIKI KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 15/127,285

(22) PCT Filed: Mar. 18, 2015

(86) PCT No.: PCT/JP2015/059276
§ 371 (c)(1),
(2) Date: Sep. 19, 2016

(87) PCT Pub. No.: WO2015/147120
PCT Pub. Date: Oct. 1, 2015

(65) Prior Publication Data
US 2017/0126161 A1    May 4, 2017

(30) Foreign Application Priority Data

Mar. 27, 2014   (JP) .................................. 2014-066650

(51) Int. Cl.
H02P 21/00 (2016.01)
H02P 21/24 (2016.01)
(Continued)

(52) U.S. Cl.
CPC .............. *H02P 21/24* (2016.02); *B60L 11/18* (2013.01); *G05B 17/02* (2013.01); *H02K 1/148* (2013.01);
(Continued)

(58) Field of Classification Search
CPC .......... H02P 21/06; H02P 21/14; H02K 16/02
See application file for complete search history.

(56) References Cited

U.S. PATENT DOCUMENTS

2008/0129243 A1   6/2008 Nashiki
2010/0219706 A1   9/2010 Watanabe et al.
(Continued)

FOREIGN PATENT DOCUMENTS

JP    H11-164535 A    6/1999
JP    2000-050585 A   2/2000
(Continued)

OTHER PUBLICATIONS

Sep. 27, 2016 International Preliminary Report on Patentability issued in Patent Application No. PCT/JP2015/059276.
(Continued)

*Primary Examiner* — Karen Masih
(74) *Attorney, Agent, or Firm* — Oliff PLC

(57) ABSTRACT

A current command value calculating unit (174) calculates current command values for a rotor winding (30) and current command values for a stator winding (20) with respect to a
(Continued)

torque command value between a first rotor (28) and a second rotor (18) and a torque command value between a stator (16) and the second rotor (18) based on an evaluation function representing a total copper loss of the rotor winding (30) and the stator winding (20) and using first and second magnetic interference models. The first magnetic interference model represents a relationship of a linkage magnetic flux $\Phi_{in}$ of the rotor winding (30) with respect to a current $I_{in}$ in the rotor winding (30) and a current $I_{out}$ in the stator winding (20). The second magnetic interference model represents a relationship of a linkage magnetic flux $\Phi_{out}$ of the stator winding (20) with respect to the current $I_{in}$, $I_{out}$.

12 Claims, 16 Drawing Sheets

(51) Int. Cl.
| | |
|---|---|
| *H02K 1/14* | (2006.01) |
| *H02K 1/24* | (2006.01) |
| *H02K 1/27* | (2006.01) |
| *H02K 3/18* | (2006.01) |
| *H02K 16/02* | (2006.01) |
| *H02K 21/16* | (2006.01) |
| *H02K 21/24* | (2006.01) |
| *H02K 51/00* | (2006.01) |
| *H02P 27/06* | (2006.01) |
| *H02K 7/00* | (2006.01) |
| *B60L 11/18* | (2006.01) |
| *G05B 17/02* | (2006.01) |

(52) U.S. Cl.
CPC .............. *H02K 1/24* (2013.01); *H02K 1/2706* (2013.01); *H02K 3/18* (2013.01); *H02K 7/006* (2013.01); *H02K 16/02* (2013.01); *H02K 21/16* (2013.01); *H02K 21/24* (2013.01); *H02K 51/00* (2013.01); *H02P 27/06* (2013.01)

(56) References Cited

U.S. PATENT DOCUMENTS

| | | | |
|---|---|---|---|
| 2012/0081060 | A1 | 4/2012 | Ishikawa et al. |
| 2012/0181903 | A1* | 7/2012 | Kato .................... H02K 11/048 310/67 R |
| 2012/0217747 | A1 | 8/2012 | Cao et al. |

FOREIGN PATENT DOCUMENTS

| | | |
|---|---|---|
| JP | 2001-069778 A | 3/2001 |
| JP | 2001-258218 A | 9/2001 |
| JP | 2004-282979 A | 10/2004 |
| JP | 2005-138779 A | 6/2005 |
| JP | 2009-033917 A | 2/2009 |
| JP | 2009-073472 A | 4/2009 |
| JP | 2009-274536 A | 11/2009 |
| JP | 2011-067044 A | 3/2011 |
| JP | 2011-205741 A | 10/2011 |
| JP | 2012-080621 A | 4/2012 |
| JP | 2013-052791 A | 3/2013 |
| WO | 2012/133905 A1 | 10/2012 |

OTHER PUBLICATIONS

Aug. 17, 2015 Search Report issued in International Patent Application No. PCT/JP2015/059276.

Jung et al, "Current Minimizing Torque Control of the IPMSM Using Ferrari's Method," IEEE Transactions on Power Electronics, vol. 28, No. 12, Dec. 2013.

* cited by examiner

INFORMATION PROCESSING DEVICE, INFORMATION STORAGE DEVICE, AND CONTROL DEVICE OF ROTARY ELECTRIC MACHINE

TECHNICAL FIELD

The present invention relates to an information processing device that calculates a current command value of a rotary electric machine, an information storage device that stores a current command value of a rotary electric machine, and a control device that controls a current of a rotary electric machine.

BACKGROUND ART

A control device of a rotary electric machine according to the below-described Patent Document 1 comprises a first rotor in which a winding is provided and which is mechanically connected to an engine, a second rotor in which a permanent magnet which is electromagnetically coupled with the winding of the first rotor is provided and which is mechanically connected to a drive shaft, a stator in which a winding which is electromagnetically coupled to the permanent magnet of the second rotor is provided, a slip ring which is electrically connected to the winding of the first rotor, a brush which electrically contacts the slip ring, a first inverter which applies a control to allow transmission and reception of electric power between a battery and the winding of the stator, and a second inverter which applies a control to allow transmission and reception of electric power between the battery and the winding of the first rotor through the slip ring and the brush. In Patent Document 1, because a motive power from the engine transmitted to the first rotor is transmitted to the second rotor by the electromagnetic coupling of the winding of the first rotor and the permanent magnet of the second rotor, the drive shaft can be driven by the motive power of the engine. During this process, the current in the winding of the first rotor may be controlled by a switching control of the second inverter, to control a torque acting between the first rotor and the second rotor. In addition, the drive shaft can also be driven by generating a motive power in the second rotor using electric power supplied through the first inverter to the winding of the stator by the electromagnetic coupling between the winding of the stator and the permanent magnet of the second rotor. In this process, the current in the winding of the stator may be controlled by a switching control of the first inverter, to control a torque acting between the stator and the second rotor.

RELATED ART REFERENCES

Patent Documents

[Patent Document 1] JP 2000-50585 A
[Patent Document 2] JP 2011-205741 A
[Patent Document 3] JP 2009-33917 A
[Patent Document 4] JP 2009-73472 A
[Patent Document 5] JP 2009-274536 A

SUMMARY OF INVENTION

Technical Problem

In Patent Document 1, the current in the winding of the first rotor is controlled based on a torque command value between the first rotor and the second rotor, and a copper loss of the winding of the first rotor changes according to the current in the winding of the first rotor. Similarly, the current in the winding of the stator is controlled based on a torque command value between the stator and the second rotor, and a copper loss of the winding of the stator changes according to the current in the winding of the stator. Because of this, depending on the torque command value between the first rotor and the second rotor and the torque command value between the stator and the second rotor, a total copper loss of the winding of the first rotor and the winding of the stator may be increased.

Moreover, when currents are simultaneously applied to the winding of the first rotor and the winding of the stator, a magnetic interference phenomenon occurs where the current in the winding of the first rotor affects the torque between the stator and the second rotor and the current in the winding of the stator affects the torque between the first rotor and the second rotor. Because the mutual torques change due to the magnetic interference, the current command value for applying an accurate control according to the torque command values cannot be determined. Even if the torque is controlled according to the torque command value, the total copper loss of the winding of the first rotor and the winding of the stator may not be the minimum.

One advantage of the present invention is that, in a rotary electric machine in which torque can act between a first rotor and a second rotor and between a stator and a second rotor, a current command value for reducing the loss due to the copper loss is calculated while controlling the torques according to the torque command values even under magnetic interference. Another advantage of the present invention is that, in the above-described rotary electric machine, the loss due to the copper loss is reduced while controlling the torques according to the torque command values even under magnetic interference.

Solution to Problem

In order to achieve at least a part of the advantages described above, an information processing device, an information storage device, and a control device of a rotary electric machine according to the present invention employ the following configurations.

According to one aspect of the present invention, there is provided an information processing device that calculates a current command value based on a torque command value of a rotary electric machine, wherein the rotary electric machine comprises a first rotor in which a rotor winding is provided, a stator in which a stator winding is provided, and a second rotor that opposes the first rotor and the stator and that is rotatable relative to the first rotor, a torque acts between the first rotor and the second rotor according to a magnetic flux due to a current in the rotor winding acting on the second rotor, and a torque acts between the stator and the second rotor according to a magnetic flux due to a current in the stator winding acting on the second rotor, a linkage magnetic flux of the stator winding can be adjusted by the current in the rotor winding and a linkage magnetic flux of the rotor winding can be adjusted by the current in the stator winding, the information processing device comprises a current command value calculating unit that calculates a current command value for the rotor winding and a current command value for the stator winding with respect to a torque command value between the first rotor and the second rotor and a torque command value between the stator and the second rotor, based on an evaluation function representing a total copper loss of the rotor winding and the stator winding and using a first magnetic interference model and a second magnetic interference model, the first magnetic interference model represents a relationship of the linkage magnetic flux of the rotor winding with respect to the current in the rotor winding and the current in the stator winding, and the second magnetic interference model represents a relationship of the linkage magnetic flux of the stator winding with respect to the current in the rotor winding and the current in the stator winding.

According to another aspect of the present invention, preferably, the first magnetic interference model and the second magnetic interference model include model equations related to a magnetomotive force, in which the current in the rotor winding and the current in the stator winding are combined with a setting ratio.

According to another aspect of the present invention, preferably, the setting ratio is 1:C, where C is a coefficient representing a degree of magnetic interference.

According to another aspect of the present invention, preferably, the first magnetic interference model and the second magnetic interference model further include model equations representing a degree of change of the linkage magnetic flux by magnetic saturation.

According to another aspect of the present invention, preferably, the first magnetic interference model and the second magnetic interference model have a model related to a d-axis linkage magnetic flux and a model related to a q-axis linkage magnetic flux.

According to another aspect of the present invention, preferably, the current command value calculating unit calculates the current command value for the rotor winding and the current command value for the stator winding based on the evaluation function and a constraint condition including a condition that a voltage of the rotor winding is less than or equal to a first limit value and a voltage of the stator winding is less than or equal to a second limit value, and using the first magnetic interference model and the second magnetic interference model.

According to another aspect of the present invention, preferably, electric power can be converted between an electricity storage device and the stator winding by a first electric power conversion device, electric power can be converted between the electricity storage device and the rotor winding by a second electric power conversion device, and the first limit value and the second limit value are set to values smaller than a voltage of the electricity storage device.

According to another aspect of the present invention, preferably, the current command value calculating unit calculates the current command value for the rotor winding and the current command value for the stator winding based on the evaluation function and a constraint condition including a condition that the current in the rotor winding is less than or equal to a third limit value and the current in the stator winding is less than or equal to a fourth limit value, and using the first magnetic interference model and the second magnetic interference model.

According to another aspect of the present invention, preferably, electric power can be converted between an electricity storage device and the stator winding by a first electric power conversion device, electric power can be converted between the electricity storage device and the rotor winding by a second electric power conversion device, the third limit value is set to a value smaller than a capacity of the second electric power conversion device, and the fourth limit value is set to a value smaller than a capacity of the first electric power conversion device.

According to another aspect of the present invention, preferably, the current command value calculating unit calculates the current command value for the rotor winding and the current command value for the stator winding such that the evaluation function is approximately minimum.

According to another aspect of the present invention, there is provided an information storage device that stores the current command value for the rotor winding and the current command value for the stator winding calculated by the information processing device according to the present invention in correspondence to the torque command value between the first rotor and the second rotor and the torque command value between the stator and the second rotor.

According to another aspect of the present invention, there is provided a control device of a rotary electric machine, that controls the current in the rotor winding and the current in the stator winding based on the current command value for the rotor winding and the current command value for the stator winding calculated by the information processing device according to the present invention.

Advantageous Effects of Invention

According to various aspects of the present invention, by calculating a current command value for a rotor winding and a current command value for a stator winding using a first magnetic interference model representing a relationship of a linkage magnetic flux of the rotor winding with respect to a current in the rotor winding and a current in the stator winding and a second magnetic interference model representing a relationship of a linkage magnetic flux of the stator winding with respect to the current in the rotor winding and the current in the stator winding and based on an evaluation function representing a total copper loss of the rotor winding and the stator winding, it is possible to calculate a current command value that reduces the loss due to the copper loss while controlling the torque between the first rotor and the second rotor and the torque between the stator and the second rotor according to the torque command values. Furthermore, by controlling the current in the rotor winding and the current in the stator winding based on the calculated current command values, it is possible to reduce the loss due to the copper loss of the rotary electric machine while controlling the torques according to the torque command values.

DESCRIPTION OF EMBODIMENTS

A preferred embodiment of the present invention (hereinafter referred to as "embodiment") will now be described with reference to the drawings.

Figure 1:
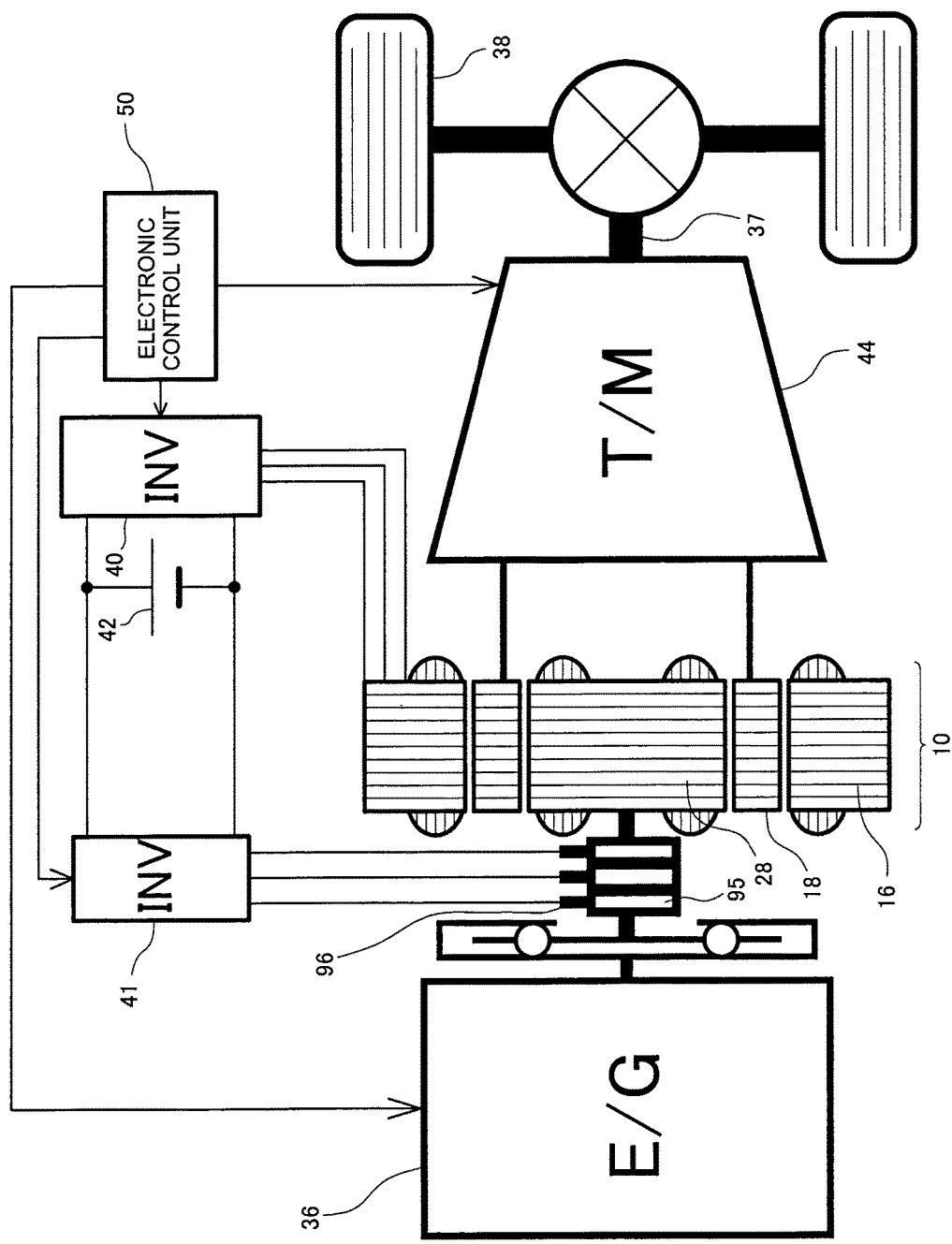
FIG. 1 is a diagram schematically showing a structure of a hybrid drive device having a control device of a rotary electric machine according to a preferred embodiment of the present invention.
Figure 2:
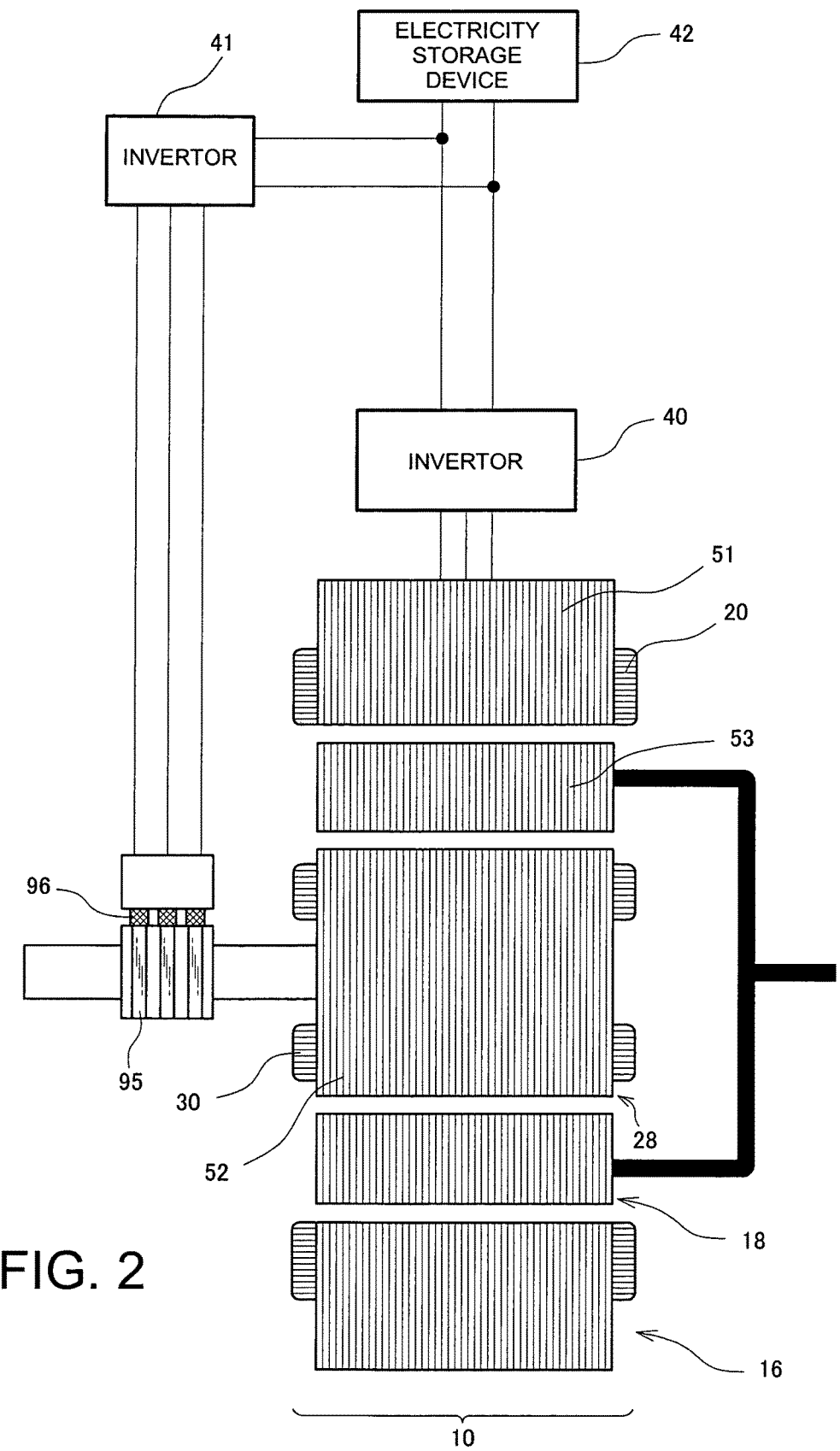
FIG. 2 is a diagram showing an example structure of a rotary electric machine.
Figure 3:
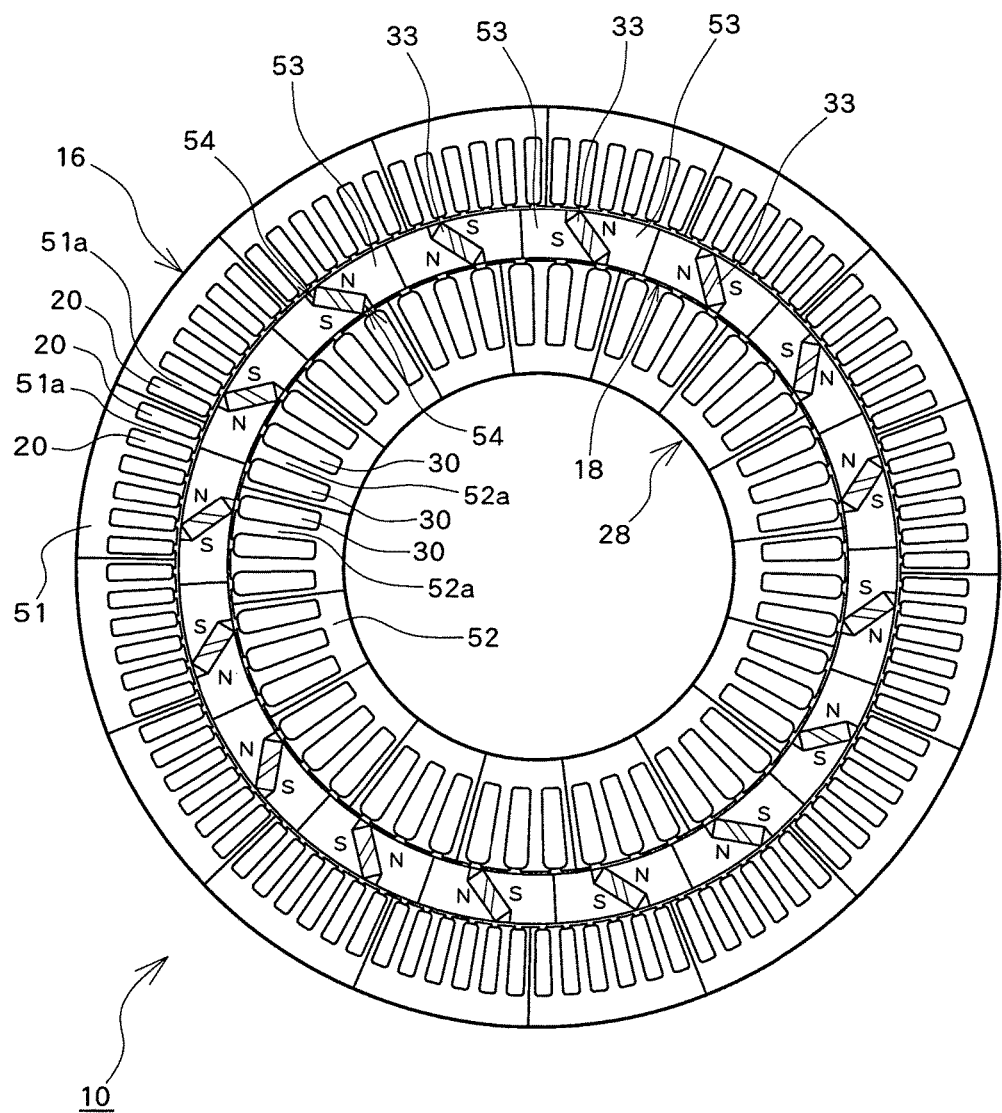
FIG. 3 is a diagram showing an example structure of a rotary electric machine.
Figure 4:
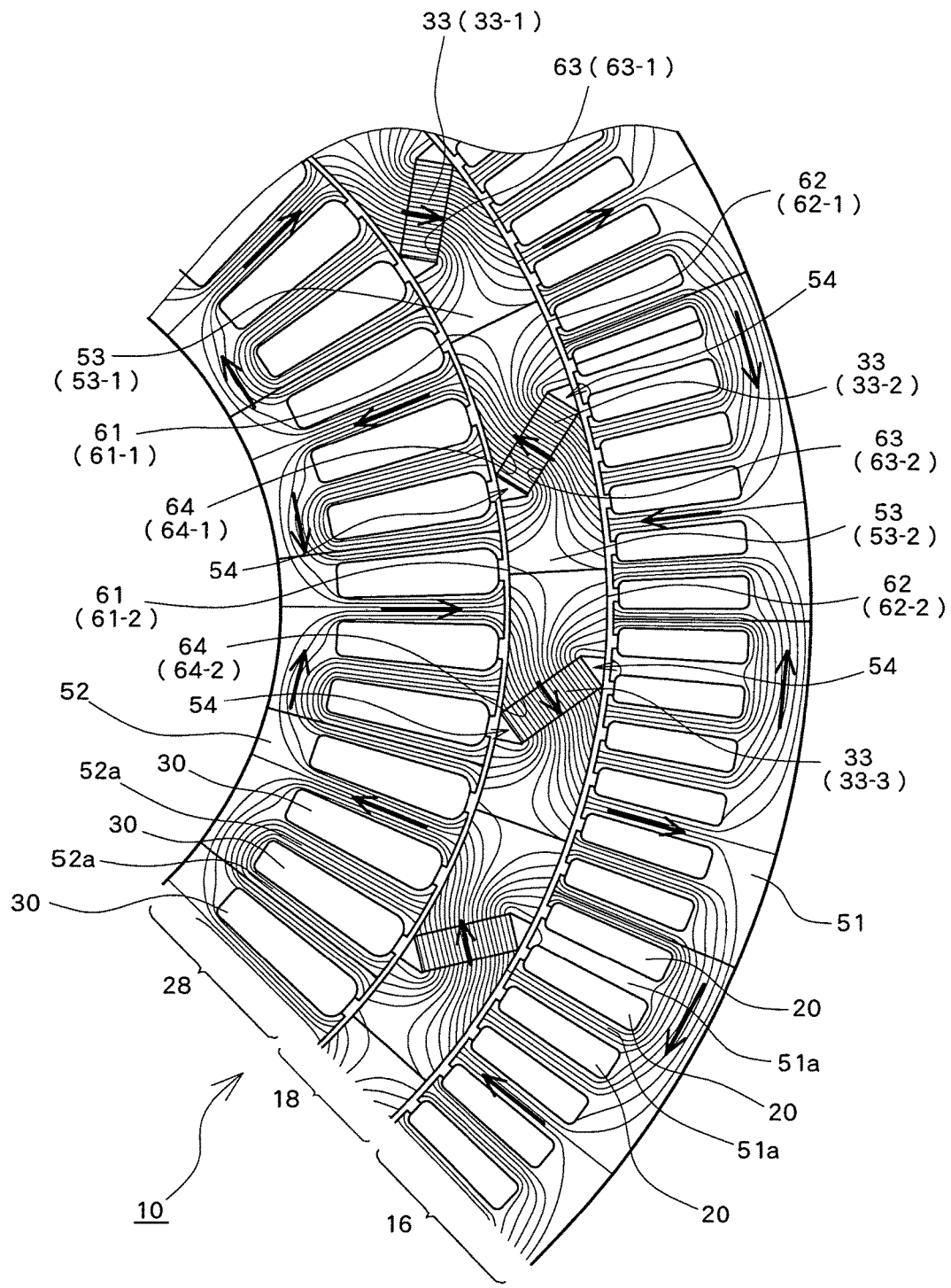
FIG. 4 is a diagram showing an example structure of a rotary electric machine.

FIGS. 1-4 are diagrams schematically showing a structure of a hybrid drive system having a control device of a rotary electric machine according to a preferred embodiment of the present invention. FIG. 1 schematically shows an overall structure, and FIGS. 2-4 schematically show the structure of a rotary electric machine 10. The hybrid drive system of the present embodiment comprises an engine (internal combustion engine) 36 provided as a prime mover that can generate motive power (mechanical motive power), a transmission (mechanical transmission) 44 that can change a gear ratio provided between the engine 36 and a drive shaft 37 (a wheel 38), and a rotary electric machine 10 provided between the engine 36 and the transmission 44, which can generate a motive power (mechanical motive power) and that can generate electric power. The hybrid drive system of the present embodiment can be used, for example, as a motive power output system for driving a vehicle.

The rotary electric machine 10 comprises a stator 16 fixed on a stator case (not shown), a first rotor 28 that can rotate relative to the stator 16, and a second rotor 18 that opposes the stator 16 and the first rotor 28 with predetermined gaps therebetween in a radial direction orthogonal to a rotational axis of the rotor, and that can rotate relative to the stator 16 and the first rotor 28. In the example configuration shown in FIGS. 1-4, the stator 16 is placed at a position on a radially outer side in relation to the first rotor 28 with a space from the first rotor 28, and the second rotor 18 is placed at a position in the radial direction between the stator 16 and the first rotor 28. In other words, the first rotor 28 is placed to oppose the second rotor 18 at a position radially inward with respect to the second rotor 18, and the stator 16 is placed to oppose the second rotor 18 at a position radially outward in relation to the second rotor 18. The first rotor 28 is mechanically connected to the engine 36, so that the motive power from the engine 36 is transmitted to the first rotor 28. Similarly, the second rotor 18 is mechanically connected to the drive shaft 37 through the transmission 44 so that the motive power from the second rotor 18 is gear-changed at the transmission 44 and transmitted to the drive shaft 37 (wheel 38). In the following description, the first rotor 28 is described as an input-side rotor, and the second rotor 18 is described as an output-side rotor.

The stator 16 includes a stator core 51 and stator windings 20 of a plurality of phases (for example, 3 phases), provided on the stator core 51 along a circumferential direction of the stator core 51. In the stator core 51, a plurality of teeth 51a protruding toward the inside in the radial direction (toward the output-side rotor 18) are placed along the circumferential direction of the stator with a space therebetween, and the stator winding 20 is wound around the teeth 51a to form the magnetic pole. An AC (alternating current) current of a plurality of phases (for example, 3 phases) flows in the stator windings 20 of the plurality of phases, so that the stator winding 20 generates a rotational magnetic field that rotates in the circumferential direction of the stator. In the example configuration of FIGS. 3 and 4, one magnetic pole is formed for six teeth 51a around which the stator windings 20 of three phases are wound.

The input-side rotor 28 includes a rotor core 52 and rotor windings 30 of a plurality of phases (for example, 3 phases), provided on the rotor core 52 along a circumferential direction of the rotor core 52. In the rotor core 52, a plurality of teeth 52a protruding toward the outside in the radial direction (toward the output-side rotor 18) are placed along the circumferential direction of the rotor with a space therebetween, and the rotor windings 30 are wound around the teeth 52a to form a magnetic pole. An AC current of a plurality of phases (for example, 3 phases) flows in the rotor windings 30 of the plurality of phases, so that the rotor winding 30 can generate a rotational magnetic field that rotates in the circumferential direction of the rotor. In the example configuration of FIGS. 3 and 4, one magnetic pole is formed for three teeth 52a around which the rotor windings 30 of three phases are wound.

The output-side rotor 18 includes a plurality (16 in the example configuration of FIGS. 3 and 4) of permanent magnets 33 placed with a space therebetween (with an equal space) along the circumferential direction of the rotor, and a plurality (the same number as the permanent magnets 33; 16 in the example configuration of FIGS. 3 and 4) of soft magnetic members 53 each of which is placed between permanent magnets 33 that are adjacent to each other in the circumferential direction of the rotor. Each of the plurality of soft magnetic members 53 placed in a divided manner with equal space in the circumferential direction of the rotor comprises an inner circumferential surface (first surface) 61 which opposes the input-side rotor 28 (teeth 52a) with a predetermined gap therebetween, an outer circumferential surface (second surface) 62 which opposes the stator 16 (teeth 51a) with a predetermined gap therebetween, a side surface (third surface) 63 which faces (contacts) a magnetic pole surface of one of adjacent permanent magnets 33, and a side surface (fourth surface) 64 which faces (contacts) a magnetic pole surface of the other of the adjacent permanent magnets 33, and a magnetic flux passes between the inner circumferential surface 61 and the outer circumferential surface 62. In the example configuration of FIGS. 3 and 4, the magnetic pole surface of each permanent magnet 33 is placed inclined with respect to the radial direction, and the side surfaces 63 and 64 of each soft magnetic member 53 are also formed inclined with respect to the radial direction. In addition, in the example configuration of FIGS. 3 and 4, in each soft magnetic member 53, a width of the inner circumferential surface 61 along the circumferential direction of the rotor is equal to the space between teeth 52a that are three teeth away from each other in the circumferential direction of the rotor, and a width of the outer circumferential surface 62 along the circumferential direction of the rotor is equal to the space between teeth 51a that are six teeth away from each other in the circumferential direction of the rotor. In the following description, when the plurality of permanent magnets need to be distinguished, the permanent magnets will be described with reference numerals 33-1, 33-2, and 33-3. Similarly, in the following description, when the plurality of soft magnetic members 53 need to be distinguished, the soft magnetic members will be described with reference numerals 53-1 and 53-2, and the inner circumferential surfaces 61, the outer circumferential surfaces 62, and side surfaces 63 and 64 of the soft magnetic members 53 will also be referred with reference numerals of 61-1, 61-2, 62-1, 62-2, 63-1, 63-2, 64-1, and 64-2 as necessary.

In each soft magnetic member 53, the magnetic pole surface of the permanent magnet 33 faced by the side surface 63 and the magnetic pole surface of the permanent magnet 33 faced by the side surface 64 have the same polarity, and the same poles of the permanent magnets 33 adjacent in the circumferential direction of the rotor are connected via the soft magnetic member 53. For example, in the soft magnetic member 53-1, the magnetic pole surface of the permanent magnet 33-1 contacted by the side surface 63-1 is an N pole surface, and the magnetic pole surface of the permanent magnet 33-2 contacted by the side surface 64-1 is an N pole surface. On the other hand, in the soft magnetic member 53-2 adjacent to the soft magnetic member 53-1 in the circumferential direction of the rotor with the permanent magnet 33-2 therebetween, the magnetic pole surface of the permanent magnet 33-2 faced by the side surface 63-2 is an S pole surface, and the magnetic pole surface of the permanent magnet 33-3 contacted by the side surface 64-2 is an S pole surface. Because of this, in the soft magnetic members 53 adjacent in the circumferential direction of the rotor (for example, the soft magnetic members 53-1 and 53-2), the magnetic pole surfaces of the permanent magnets 33 faced by the side surfaces 63 and 64 are of opposite polarities from each other, and the soft magnetic member 53 in which the side surfaces 63 and 64 contact the N pole surfaces of the permanent magnets 33 and the soft magnetic member 53 in which the side surfaces 63 and 64 contact the S pole surfaces of the permanent magnets 33 are alternately placed along the circumferential direction of the rotor. In addition, between the soft magnetic members 53 adjacent in the circumferential direction of the rotor (for example, the soft magnetic members 53-1 and 53-2), in addition to the permanent magnets 33, a gap 54 for increasing the magnetic resistance is provided. Alternatively, a non-magnetic material may be provided in place of the gap 54. Alternatively, the soft magnetic members 53 adjacent in the circumferential direction of the rotor (for example, soft magnetic members 53-1 and 53-2) may be connected to each other by a bridge.

FIG. 4 shows a flow of a field magnetic flux by the permanent magnets 33. As shown in FIG. 4 by the arrows, in the soft magnetic member 53-1, the field magnetic flux by the permanent magnet 33-1 flows from the side surface 63-1 to the inner circumferential surface 61-1 and the outer circumferential surface 62-1, and a field magnetic flux by the permanent magnet 33-2 flows from the side surface 64-1 to the inner circumferential surface 61-1 and the outer circumferential surface 62-1. In relation to the input-side rotor 28, the inner circumferential surface 61-1 of the soft magnetic member 53-1 functions as the N pole surface, and a field magnetic flux acts from the inner circumferential surface 61-1 of the soft magnetic member 53-1 to the input-side rotor 28 (teeth 52a). In relation to the stator 16, the outer circumferential surface 62-1 of the soft magnetic member 53-1 functions as the N pole surface, and a field magnetic flux acts from the outer circumferential surface 62-1 of the soft magnetic member 53-1 to the stator 16 (teeth 51a). On the other hand, in the soft magnetic member 53-2, a field magnetic flux by the permanent magnet 33-2 flows from the inner circumferential surface 61-2 and the outer circumferential surface 62-2 to the side surface 63-2, and a field magnetic flux by the permanent magnet 33-3 flows from the inner circumferential surface 61-2 and the outer circumferential surface 62-2 to the side surface 63-3. In relation to the input-side rotor 28, the inner circumferential surface 61-2 of the soft magnetic member 53-2 functions as the S pole surface, and a field magnetic flux acts from the input-side rotor 28 (teeth 52a) to the inner circumferential surface 61-2 of the soft magnetic member 53-2. In relation to the stator 16, the outer circumferential surface 62-2 of the soft magnetic member 53-2 functions as the S pole surface, and a field magnetic flux acts from the stator 16 (teeth 51a) to the outer circumferential surface 62-2 of the soft magnetic member 53-2. In this manner, the inner circumferential surface 61 and the outer circumferential surface 62 of the same soft magnetic member 53 function as the magnetic pole surfaces of the same polarity. In the circumferential direction of the rotor, the inner circumferential surface 61 functioning as the N pole surface and the inner circumferential surface 61 functioning as the S pole surface are alternately placed, and the outer circumferential surface 62 functioning as the N pole surface and the outer circumferential surface 62 functioning as the S pole surface are alternately placed. In the inside of each soft magnetic member 53, in order to facilitate passing of the magnetic flux between the inner circumferential surface 61 and the outer circumferential surface 62, between the side surfaces 63 and 64 and the inner circumferential surface 61, and between the side surfaces 63 and 64 and the outer circumferential surface 62, the gap and the non-magnetic material are preferably not provided, and a portion of high magnetic resistance is preferably not provided.

An electricity storage device 42 which can be charged and discharged and which is provided as a DC (direct current) power supply can be formed by, for example, a secondary battery, and stores electric energy. An inverter 40 provided as the first electric power conversion device for converting electric power between the electricity storage device 42 and the stator winding 20 can be realized by a known structure having a switching element and a diode (rectifying element) connected inversely parallel with respect to the switching element, and can convert DC electric power from the electricity storage device 42 into AC power (for example, 3-phase AC power) by a switching operation of the switching element and supply the converted power to each phase of the stator winding 20. In addition, the inverter 40 can also convert the electric power in a direction to convert the AC current flowing in each phase of the stator winding 20 into DC current and to recover the electric energy into the electricity storage device 42. As described, the inverter 40 can convert the electric power in both directions between the electricity storage device 42 and the stator winding 20.

A slip ring 95 is mechanically connected to the input-side rotor 28, and is electrically connected to each phase of the rotor winding 30. A brush 96 having its rotation fixed is pressed against the slip ring 95 and electrically contacts the slip ring 95. The slip ring 95 rotates along with the input-side rotor 28 while sliding with respect to the brush 96 (while maintaining electrical contact with the brush 96). The brush 96 is electrically connected to an inverter 41. The inverter 41 provided as a second electric power conversion device that converts electric power between at least one of the electricity storage device 42 and the inverter 40 and the rotor winding 30 can be realized by a known structure having a switching element and a diode (rectifying element) connected inversely parallel with respect to the switching element, and can convert DC electric power from the electricity storage device 42 into AC power (for example, 3-phase AC power) by a switching operation of the switching element and supply the converted power to each phase of the rotor winding 30 through the brush 96 and the slip ring 95. In addition, the inverter 41 can also convert the electric power in a direction to convert the AC current flowing in each phase of the rotor winding 30 into DC current. In this process, the AC electric power of the rotor winding 30 is taken out by the slip ring 95 and the brush 96, and the taken-out AC electric power is converted into DC power by the inverter 41. The electric power converted to DC by the inverter 41 may be converted into AC power by the inverter 40 and supplied to each phase of the stator winding 20. In other words, the inverter 40 can convert at least one of the DC electric power from the inverter 41 and the DC electric power from the electricity storage device 42 into AC power, and supply the converted power to each phase of the stator winding 20. In addition, the electric power converted into DC by the inverter 41 can be recovered into the electricity storage device 42. As described, the inverter 41 can convert electric power in both directions between one of the electricity storage device 42 and the inverter 40 and the rotor winding 30.

An electronic control unit 50 is formed as a microprocessor with a CPU as a core, and comprises a ROM that stores a processing program, a RAM that temporarily stores data, and an input/output port. The electronic control unit 50 controls the electric power conversion at the inverter 40 by controlling the switching operation of the switching element of the inverter 40, to control the AC current flowing in each phase of the stator winding 20. The electronic control unit 50 also controls the electric power conversion at the inverter 41 by controlling the switching operation of the switching element of the inverter 41, to control the AC current flowing in each phase of the rotor winding 30. Further, the electronic control unit 50 controls an operation state of the engine 36, and a gear ratio of the transmission 44.

With the switching operation of the inverter 40, an AC current of 3 phases flows in the stator winding 20 of 3 phases, the stator winding 20 generates a rotational magnetic flux that rotates in the circumferential direction of the stator, and a magnetic flux due to the current in the stator winding 20 acts on the output-side rotor 18. In response, by an electromagnetic interaction (attraction and repulsion) between the rotational magnetic flux generated by the AC current in the stator winding 20 and the field magnetic flux generated by the permanent magnet 33 flowing between the outer circumferential surface 62 and the 2D side surfaces 63 and 64 of the soft magnetic member 53, a torque $T_{out}$ can be caused to act between the stator 16 and the output-side rotor 18, and the output-side rotor 18 can be rotationally driven. In other words, the electric power supplied from the electricity storage device 42 to the stator winding 20 through the inverter 40 can be converted into the motive power (mechanical motive power) of the output-side rotor 18, and the stator 16 and the output-side rotor 18 can function as a synchronous motor (PM motor unit). Moreover, the motive power of the output-side rotor 18 can be converted into the electric power of the stator winding 20, and the electric power can be recovered into the electricity storage device 42 through the inverter 40. The electronic control unit 50 can control the torque (PM motor torque) $T_{out}$ acting between the stator 16 and the output-side rotor 18, by controlling, for example, at least one of an amplitude and a phase angle of the AC current flowing in the stator winding 20 by the switching operation of the inverter 40.

When the input-side rotor 28 rotates relative to the output-side rotor 18 and a rotation difference is caused between the input-side rotor 28 and the output-side rotor 18, an induced electromotive force is generated in the rotor winding 30, an induced current (AC current) flows in the rotor winding 30 due to the induced electromotive force, a rotational magnetic field is generated, and a magnetic flux due to the current in the rotor winding 30 acts on the output-side rotor 18. In response, by an electromagnetic interaction between the rotational magnetic field generated by the induced current in the rotor winding 30 and the field magnetic flux by the permanent magnet 33 flowing between the inner circumferential surface 61 and the side surfaces 63 and 64 of the soft magnetic member 53, a torque $T_{in}$ can be caused to act between the input-side rotor 28 and the output-side rotor 18, and the output-side rotor 18 can be rotationally driven. Because of this, the motive power (mechanical motive power) can be transmitted between the input-side rotor 28 and the output-side rotor 18, and the input-side rotor 28 and the output-side rotor 18 can function as an induction electromagnetic coupling unit.

When the torque (electromagnetic coupling torque) $T_{in}$ is to be generated between the input-side rotor 28 and the output-side rotor 18 by the induced current in the rotor winding 30, the electronic control unit 50 applies the switching operation of the inverter 41 to allow flow of the induced current in the rotor winding 30. In this process, the electronic control unit 50 can control the electromagnetic coupling torque $T_{in}$ acting between the input-side rotor 28 and the output-side rotor 18 by controlling the AC current flowing in the rotor winding 30 by the switching operation of the inverter 41. On the other hand, when the electronic control unit 50 stops the switching operation by maintaining the switching element of the inverter 41 at the OFF state, the induced current does not flow in the rotor winding 30, and the torque $T_{in}$ does not act between the input-side rotor 28 and the output-side rotor 18.

When the engine 36 is generating the motive power, the motive power of the engine 36 is transmitted to the input-side rotor 28, and the input-side rotor 28 is rotationally driven in the engine rotation direction. When a rotational speed of the input-side rotor 28 becomes higher than a rotational speed of the output-side rotor 18, the induced electromotive force is generated in the rotor winding 30. The electronic control unit 50 applies the switching operation of the inverter 41 to allow the flow of the induced current in the rotor winding 30. In response to the magnetic flux due to the current in the rotor winding 30 acting on the output-side rotor 18, the electromagnetic coupling torque $T_{in}$ in the engine rotation direction acts from the input-side rotor 28 to the output-side rotor 18, and the output-side rotor 18 is rotationally driven in the engine rotation direction. In this manner, the motive power from the engine 36 transmitted to the input-side rotor 28 is transmitted to the output-side rotor 18 by the electromagnetic coupling between the rotor winding 30 of the input-side rotor 28 and the permanent magnet 33 of the output-side rotor 18. The motive power transmitted to the output-side rotor 18 is gear-changed by the transmission 44 and is transmitted to the drive shaft 37 (wheel 38), and is used for forward rotation driving of a load such as a forward travel driving of the vehicle. Therefore, the wheel 38 can be rotationally driven in the forward rotation direction using the motive power of the engine 36, and the vehicle can be driven in the forward traveling direction. In addition, because the rotational difference between the input-side rotor 28 and the output-side rotor 18 can be tolerated, even when the rotation of the wheel 38 is stopped, the engine 36 does not stall. Because of this, the rotary electric machine 10 can be caused to function as a travel starting device, obviating the need for separate provision of a travel starting device such as a frictional clutch and a torque converter.

Moreover, the AC electric power generated in the rotor winding 30 is taken out through the slip ring 95 and the brush 96. The taken-out AC electric power is converted into DC power by the inverter 41. With the switching operation of the inverter 40, the DC electric power from the inverter 41 is converted into AC power by the inverter 40 and supplied to the stator winding 20, so that an AC current flows in the stator winding 20, and a rotational magnetic flux is formed in the stator 16. In response to the magnetic flux due to the current in the stator winding 20 acting on the output-side rotor 18, the torque $T_{out}$ in the engine rotation direction can be caused to act from the stator 16 to the output-side rotor 18. With such a configuration, a torque amplification function for amplifying the torque in the engine rotation direction of the output-side rotor 18 can be realized. In addition, the DC electric power from the inverter 41 can be recovered into the electricity storage device 42.

Further, by controlling the switching operation of the inverter 40 to supply electric power from the electricity storage device 42 to the stator winding 20, it is possible to rotationally drive the wheel 38 in the forward rotation direction using the motive power of the engine 36, and to assist the rotational driving in the forward rotation direction of the wheel 38 by the motive power of the output-side rotor 18 generated using the supplied electric power to the stator winding 20. In addition, during a deceleration operation of the load, the electronic control unit 50 can control the switching operation of the inverter 40 to recover the electric power from the stator winding 20 to the electricity storage device 42, so that the motive power of the load can be converted into the electric power of the stator winding 20 by the electromagnetic coupling between the stator winding 20 and the permanent magnet 33, and the electric power can be recovered into the electricity storage device 42.

When EV (Electric Vehicle) travel is to be executed in which the load is driven (the wheel 38 is rotationally driven) without using the motive power of the engine 36, but using the motive power of the rotary electric machine 10, the electronic control unit 50 controls the switching operation of the inverter 40 to control the driving of the load. For example, the electronic control unit 50 controls the switching operation of the inverter 40 to convert the DC electric power from the electricity storage device 42 into AC power and supply the converted power to the stator winding 20. With such a configuration, the supplied electric power to the stator winding 20 is converted into the motive power of the output-side rotor 18 by the electromagnetic coupling between the stator winding 20 and the permanent magnet 33, and the drive shaft 37 (wheel 38) is rotationally driven. In this manner, even when the engine 36 is not generating the motive power, the wheel 38 can be rotationally driven by supplying electric power to the stator winding 20.

Here, in the stator 16 and the output-side rotor 18, the direction in which the magnetomotive force by the permanent magnet 33 acts on the stator 16; more specifically, a direction of the magnetic flux of the magnet passing through a center position of the outer circumferential surface 62 of the soft magnetic member 53 in the circumferential direction of the rotor, is set as a d-axis (magnetic flux axis), and a position deviated from the d-axis by 90° in the electric angle (position at an end of the outer circumferential surface 62 in the circumferential direction of the rotor) is set as a q-axis (torque axis). In the outer circumferential surface 62 of the soft magnetic member 53, a current in the stator winding 20 for maximizing the d-axis magnetic flux passing through the center position in the circumferential direction of the rotor (minimizing the q-axis magnetic flux passing through the position of the end in the circumferential direction of the rotor) is set as a d-axis current, and a current in the stator winding 20 for maximizing the q-axis magnetic flux passing through the position of the end in the circumferential direction of the rotor (minimizing the d-axis magnetic flux passing through the center position in the circumferential direction of the rotor) is set as a q-axis current. Similarly, in the input-side rotor 28 and the output-side rotor 18, a direction in which the magnetomotive force by the permanent magnet 33 acts on the input-side rotor 28; more specifically, a direction of the magnetic flux of the magnet passing through a center position of the inner circumferential surface 61 of the soft magnetic member 53 in the circumferential direction of the rotor, is set as the d-axis, and a position deviated from the d-axis by 90° in the electric angle (position of the end of the inner circumferential surface 61 in the circumferential direction of the rotor) is set as the q-axis. In the inner circumferential surface 61 of the soft magnetic member 53, a current in the rotor winding 30 for maximizing a d-axis magnetic flux passing through a center position in the circumferential direction of the rotor (minimizing a q-axis magnetic flux passing through the position of the end in the circumferential direction of the rotor) is set as the d-axis current, and a current in the rotor winding 30 for maximizing the q-axis magnetic flux passing through the position of the end in the circumferential direction of the rotor (minimizing the d-axis magnetic flux passing through the center position in the circumferential direction of the rotor) is set as the q-axis current.

Figure 5:
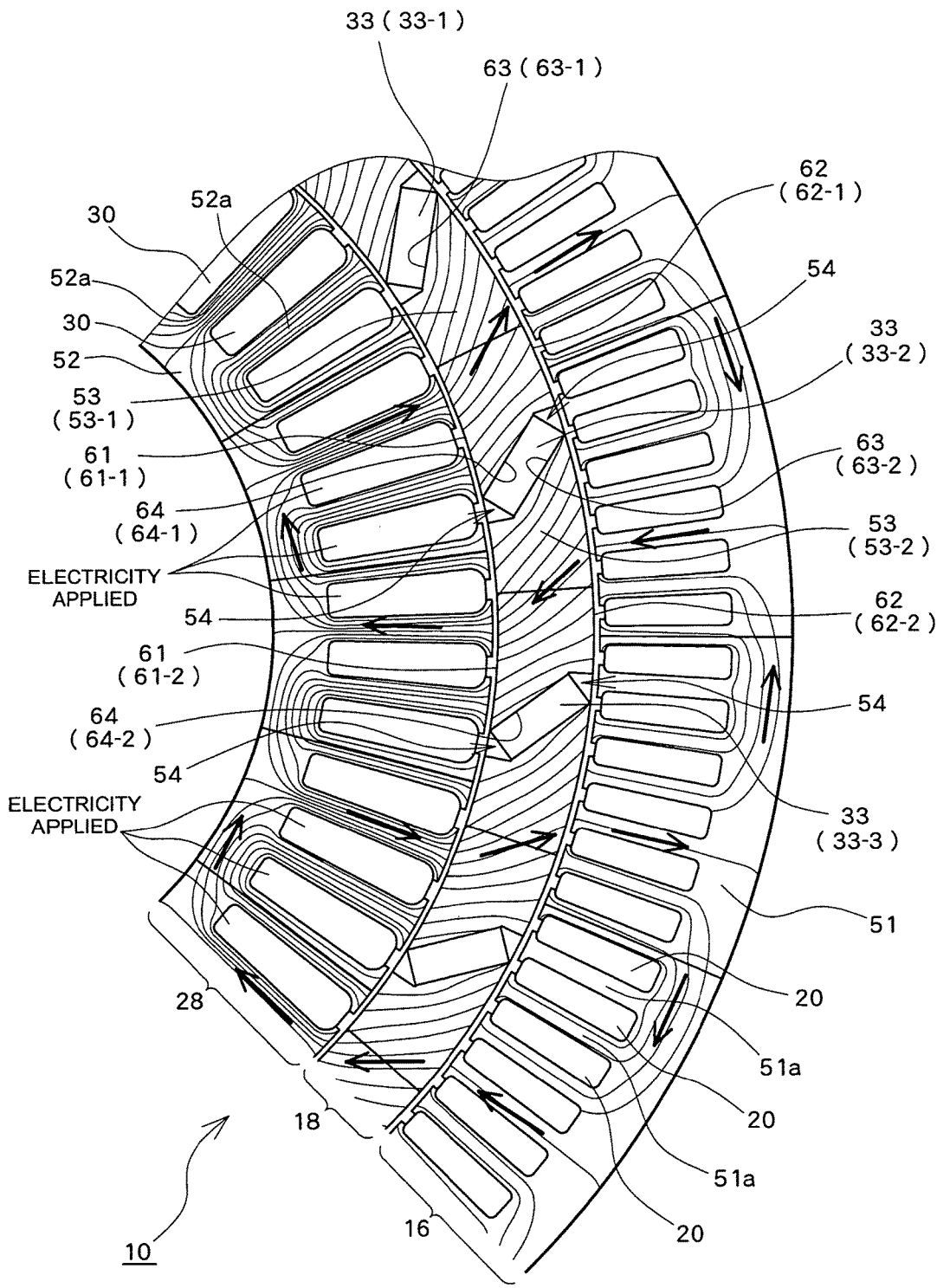
FIG. 5 is a diagram showing a flow of a d-axis magnetic flux when a d-axis current flows in a rotor winding.

FIG. 5 shows a flow of the d-axis magnetic flux in the case where the d-axis current flows in the rotor winding 30. As shown by the arrows in FIG. 5, the d-axis magnetic flux due to the d-axis current in the rotor winding 30 acts from the input-side rotor 28 (teeth 52a) to the inner circumferential surface 61-1 of the soft magnetic member 53-1, flows in the soft magnetic member 53-1 from the inner circumferential surface 61-1 to the outer circumferential surface 62-1, and acts on the stator 16 (teeth 51a) and is linked to the stator winding 20. The d-axis magnetic flux flowing in the stator 16 acts from the teeth 51a to the outer circumferential surface 62-2 of the soft magnetic member 53-2, flows in the soft magnetic member 53-2 from the outer circumferential surface 62-2 to the inner circumferential surface 61-2, and returns to the input-side rotor 28 (teeth 52a). As shown by the arrows in FIGS. 4 and 5, the d-axis magnetic flux due to the d-axis current in the rotor winding 30 acts in the opposite direction from the field magnetic flux by the permanent magnet 33 for the input-side rotor 28, and acts in the same direction as the field magnetic flux by the permanent magnet 33 for the stator 16. Because of this, by generating the d-axis magnetic flux by the d-axis current in the rotor winding 30 to weaken the field magnetic flux acting from the permanent magnet 33 to the input-side rotor 28, it is possible to strengthen the field magnetic flux acting from the permanent magnet 33 to the stator 16. In addition, by generating the d-axis magnetic flux by the d-axis current in the rotor winding 30 to strengthen the field magnetic flux acting from the permanent magnet 33 to the input-side rotor 28, it is possible to weaken the field magnetic flux acting from the permanent magnet 33 to the stator 16. In this manner, the d-axis magnetic flux due to the d-axis current in the rotor winding 30 affects the linkage magnetic flux to the stator winding 20 by flowing between the inner circumferential surface 61 and the outer circumferential surface 62 of the soft magnetic member 53 and acting on the stator 16.

Figure 6:
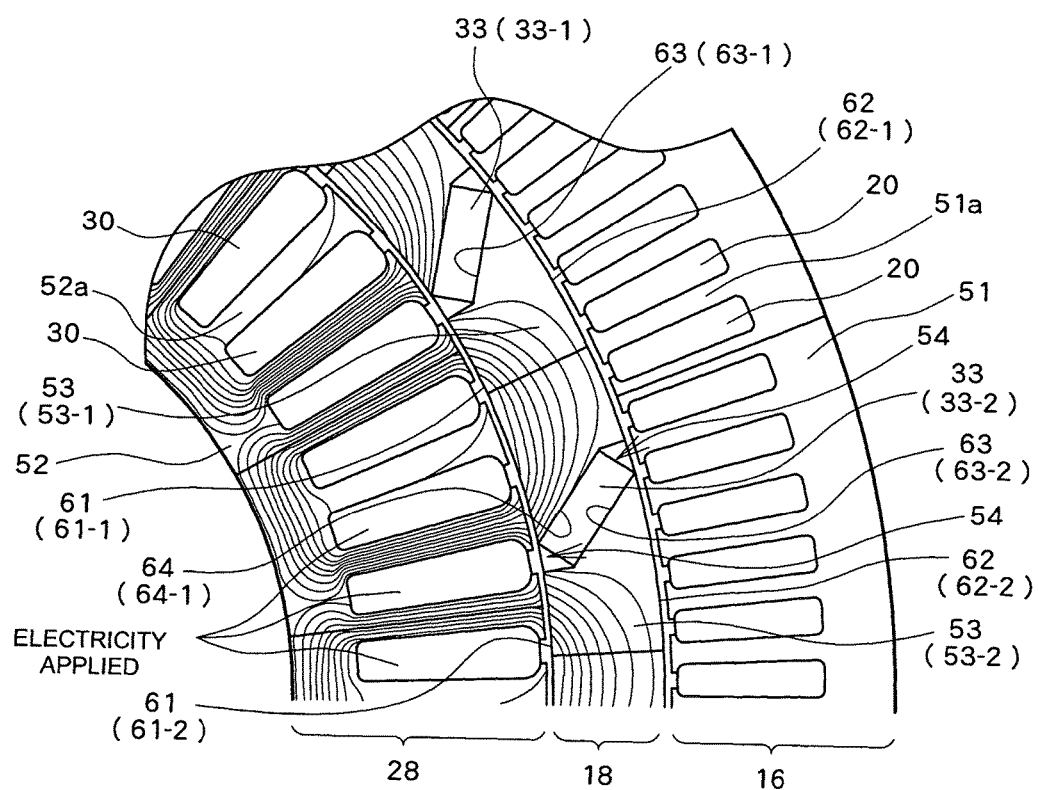
FIG. 6 is a diagram showing a flow of a q-axis magnetic flux when a q-axis current flows in a rotor winding.

Meanwhile, FIG. 6 shows a flow of the q-axis magnetic flux in the case where the q-axis current flows in the rotor winding 30. As shown in FIG. 6, the q-axis magnetic flux due to the q-axis current in the rotor winding 30 acts from the input-side rotor 28 (teeth 52a) to the inner circumferential surface 61-1 of the soft magnetic member 53-1, and flows in the soft magnetic member 53-1. Compared to the d-axis magnetic flux, the amount of the q-axis magnetic flux acting from the outer circumferential surface 62-2 of the soft magnetic member 53-1 to the stator 16 (teeth 51a) is lower, and a large part of the q-axis magnetic flux flowing in the soft magnetic member 53-1 returns from the inner circumferential surface 61-1 of the soft magnetic member 53-1 to the input-side rotor 28 (teeth 52a). The flow of the q-axis magnetic flux in the soft magnetic member 53-2 is similar to that in the soft magnetic member 53-1. Therefore, compared to the d-axis magnetic flux, the influence of the q-axis magnetic flux due to the q-axis current in the rotor winding 30 on the linkage magnetic flux to the stator winding 20 is lower.

Figure 7:
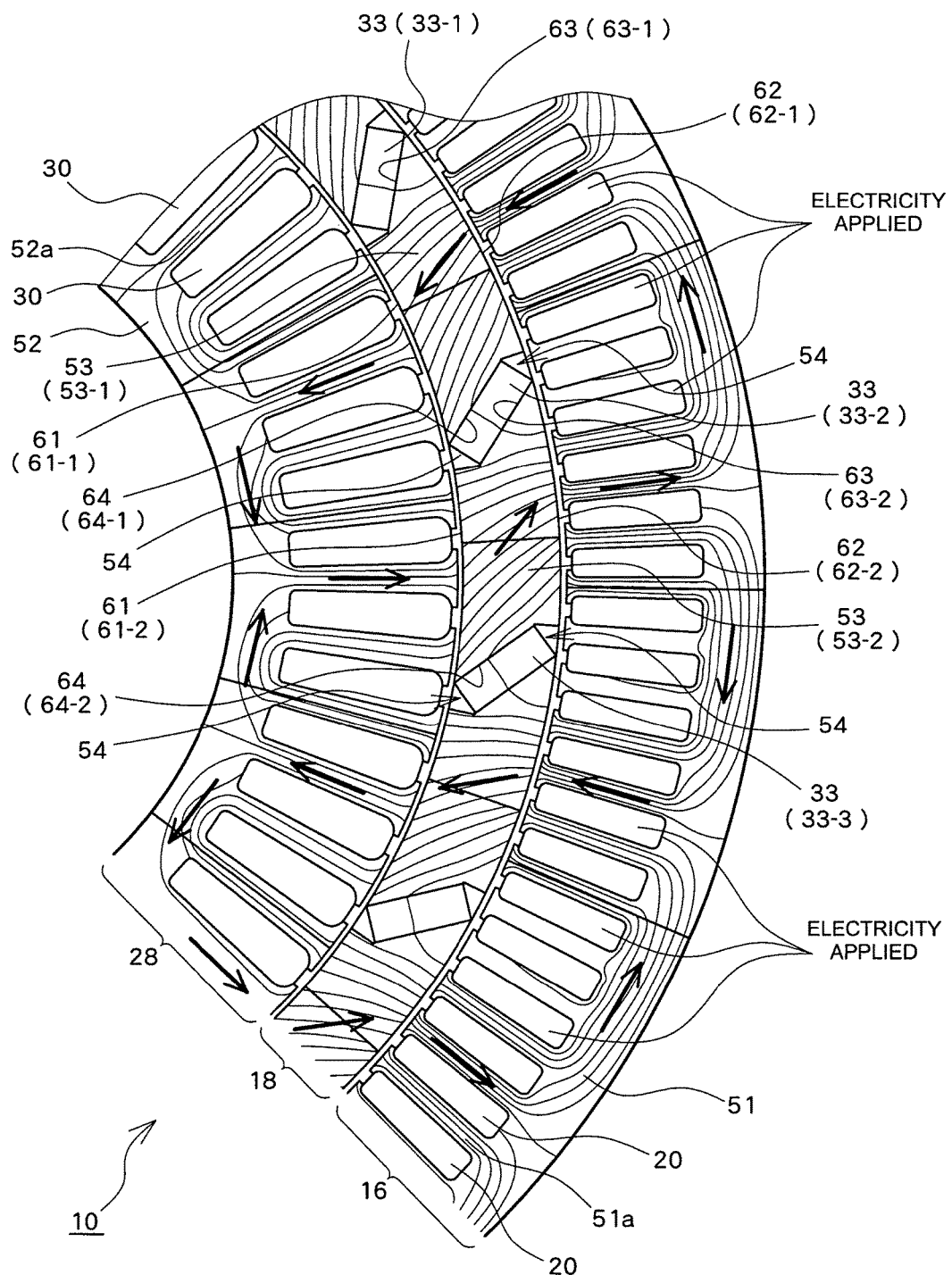
FIG. 7 is a diagram showing a flow of a d-axis magnetic flux when a d-axis current flows in a stator winding.

FIG. 7 shows a flow of the d-axis magnetic flux in the case where the d-axis current flows in the stator winding 20. As shown by the arrows in FIG. 7, the d-axis magnetic flux due to the d-axis current in the stator winding 20 acts from the stator 16 (teeth 51a) to the outer circumferential surface 62-1 of the soft magnetic member 53-1, flows in the soft magnetic member 53-1 from the outer circumferential surface 62-1 to the inner circumferential surface 61-1, and acts on the input-side rotor 28 (teeth 52a) and is linked to the rotor winding 30. The d-axis magnetic flux flowing in the input-side rotor 28 acts from the teeth 52a to the inner circumferential surface 61-2 of the soft magnetic member 53-2, flows in the soft magnetic member 53-2 from the inner circumferential surface 61-2 to the outer circumferential surface 62-2, and returns to the stator 16 (teeth 51a). As shown by the arrows in FIGS. 4 and 7, the d-axis magnetic flux due to the d-axis current in the stator winding 20 acts in an opposite direction from the field magnetic flux by the permanent magnet 33 for the stator 16, and acts in the same direction as the field magnetic flux by the permanent magnet 33 for the input-side rotor 28. Because of this, by generating the d-axis magnetic flux by the d-axis current in the stator winding 20 to weaken the field magnetic flux acting from the permanent magnet 33 to the stator 16, it is possible to strengthen the field magnetic flux acting from the permanent magnet 33 to the input-side rotor 28. Similarly, by generating the d-axis magnetic flux by the d-axis current in the stator winding 20 to strengthen the field magnetic flux acting from the permanent magnet 33 to the stator 16, it is possible to weaken the field magnetic flux acting from the permanent magnet 33 to the input-side rotor 28. In this manner, the d-axis magnetic flux due to the d-axis current in the stator winding 20 affects the linkage magnetic flux to the rotor winding 30 by flowing between the outer circumferential surface 62 and the inner circumferential surface 61 of the soft magnetic member 53 and acting on the input-side rotor 28.

Figure 8:
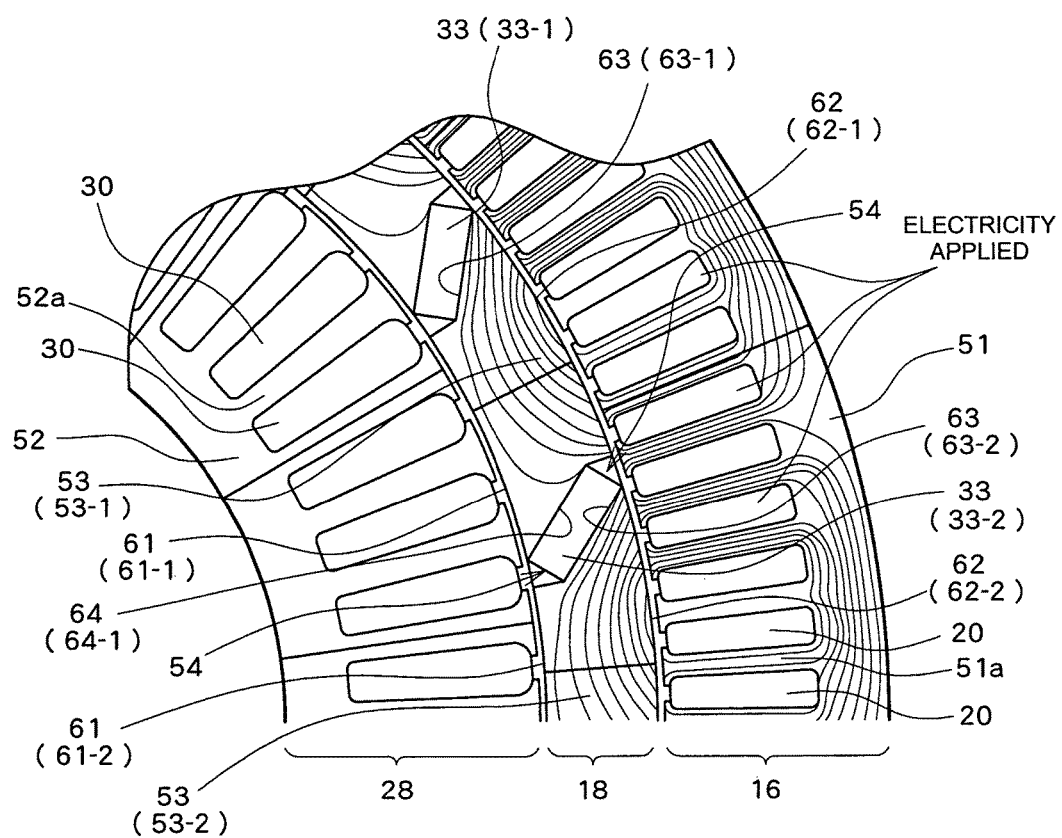
FIG. 8 is a diagram showing a flow of a q-axis magnetic flux when a q-axis current flows in a stator winding.

On the other hand, FIG. 8 shows a flow of the q-axis magnetic flux in the case where the q-axis current flows in the stator winding 20. As shown in FIG. 8, the q-axis magnetic flux by the q-axis current in the stator winding 20 acts from the stator 16 (teeth 51a) to the outer circumferential surface 62-1 of the soft magnetic member 53-1, and flows in the soft magnetic member 53-1. Compared to the d-axis magnetic flux, the amount of the q-axis magnetic flux acting from the inner circumferential surface 61-1 of the soft magnetic member 53-1 to the input-side rotor 28 (teeth 52a) is lower, and a large part of the q-axis magnetic flux flowing in the soft magnetic member 53-1 returns from the outer circumferential surface 62-1 of the soft magnetic member 53-1 to the stator 16 (teeth 51a). The flow of the q-axis magnetic flux in the soft magnetic member 53-2 is similar to that in the soft magnetic member 53-1. Therefore, compared to the d-axis magnetic flux, the influence of the q-axis magnetic flux due to the q-axis current in the stator winding 20 on the linkage magnetic flux to the rotor winding 30 is lower.

Thus, when the AC current is applied to the rotor winding 30 and the stator winding 20, the d-axis magnetic flux component due to the d-axis current component in the rotor winding 30 can weaken the field magnetic flux by the permanent magnet 33 acting on the input-side rotor 28, and strengthen the field magnetic flux by the permanent magnet 33 acting on the stator 16. In other words, the d-axis magnetic flux component due to the d-axis current component in the rotor winding 30 can be set as a weakening field magnetic flux for the rotor winding 30 itself, and also as a strengthening field magnetic flux for the stator winding 20. The strengthening field magnetic flux interacts with the q-axis current component in the stator winding 20, so that an additional torque separate from a magnet torque and a reluctance torque is generated between the stator 16 and the output-side rotor 18, and a torque amplification effect can be obtained. In this process, unlike the strengthening field control of the related art, because the weakening field for the rotor winding 30 itself is used, it is possible to amplify the torque $T_{out}$ between the stator 16 and the output-side rotor 18 while inhibiting a counter electromotive force in the rotor winding 30.

Similarly, when the AC current is applied to the rotor winding 30 and the stator winding 20, the d-axis magnetic flux component due to the d-axis current component in the stator winding 20 can weaken the field magnetic flux by the permanent magnet 33 acting on the stator 16, and strengthen the field magnetic flux by the permanent magnet 33 acting on the input-side rotor 28. In other words, the d-axis magnetic flux component due to the d-axis current component in the stator winding 20 can be set as a weakening field magnetic flux for the stator winding 20 itself, and also as a strengthening field magnetic flux for the rotor winding 30. The strengthening field magnetic flux interacts with the q-axis current component in the rotor winding 30 so that an additional torque is also generated between the input-side rotor 28 and the output-side rotor 18, and a torque amplification effect can be obtained. In this process, unlike the strengthening field control of the related art, because the weakening field for the stator winding 20 itself is used, the torque $T_{in}$ between the input-side rotor 28 and the output-side rotor 18 can be amplified while inhibiting the counter electromotive force in the stator winding 20. Therefore, a multiplier effect can be obtained in which the torque $T_{in}$ between the input-side rotor 28 and the output-side rotor 18 and the torque $T_{out}$ between the stator 16 and the output-side rotor 18 strengthen each other, while inhibiting the counter electromotive forces in the rotor winding 30 and the stator winding 20. As a result, the amount of permanent magnets 33 can be reduced.

In addition, when an AC current is applied to the rotor winding 30 and the stator winding 20, the d-axis magnetic flux component due to the d-axis current component in the rotor winding 30 can strengthen the field magnetic flux by the permanent magnet 33 acting on the input-side rotor 28, and weaken the field magnetic flux by the permanent magnet 33 acting on the stator 16. With this configuration, it is possible to amplify the torque $T_{in}$ between the input-side rotor 28 and the output-side rotor 18 while inhibiting the counter electromotive force in the stator winding 20. Similarly, the d-axis magnetic flux component due to the d-axis current component in the stator winding 20 can strengthen the field magnetic flux by the permanent magnet 33 acting on the stator 16, and weaken the field magnetic flux by the permanent magnet 33 acting on the input-side rotor 28. With such a configuration, the torque $T_{out}$ between the stator 16 and the output-side rotor 18 can be amplified while inhibiting the counter electromotive force in the rotor winding 30.

Figure 9:
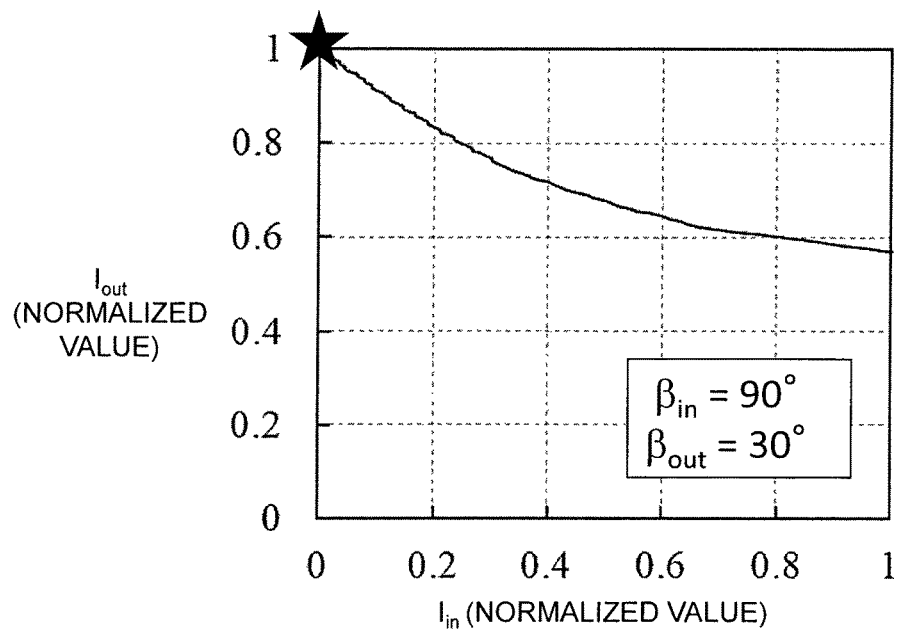
FIG. 9 is a diagram showing an example relationship of currents $I_{in}$ and $I_{out}$ for torques of $T_{in}=0$ and $T_{out}=90$ Nm.

In this manner, in the rotary electric machine 10, because the magnetic flux due to the current in the rotor winding 30 and the magnetic flux due to the current in the stator winding 20 magnetically interferes with each other, the linkage magnetic flux to the stator winding 20 can be adjusted by the current in the rotor winding 30 and the linkage magnetic flux to the rotor winding 30 can be adjusted by the current in the stator winding 20. When the magnetic interference between the magnetic flux due to the current in the rotor winding 30 and the magnetic flux due to the current in the stator winding 20 is to be used, there are infinite combinations of a current $I_{in}$ in the rotor winding 30 and a current $I_{out}$ in the stator winding 20 for setting the torque $T_{in}$ between the input-side rotor 28 and the output-side rotor 18 and the torque $T_{out}$ between the stator 16 and the output-side rotor 18 to requested values. For example, FIG. 9 shows a relationship for the combinations of $I_{in}$ and $I_{out}$ for generating $T_{in}$=0 and $T_{out}$=90 Nm. In FIG. 9, a current advance angle $\beta_{in}$ of the rotor winding 30 is $\beta_{in}$=90°, a current advance angle $\beta_{out}$ of the stator winding 20 is $\beta_{out}$=30°, and, the $I_{in}$ on the horizontal axis and the $I_{out}$ on the vertical axis are normalized by dividing these values by $I_{out}$ which generates $T_{out}$=90° at $I_{in}$=0 (that is, a current value that does not use the magnetic interference). As shown in FIG. 9, there are infinite combinations of $I_{in}$ and $I_{out}$ for generating $T_{in}$=0 and $T_{out}$=90 Nm using the magnetic interference.

Figure 10:
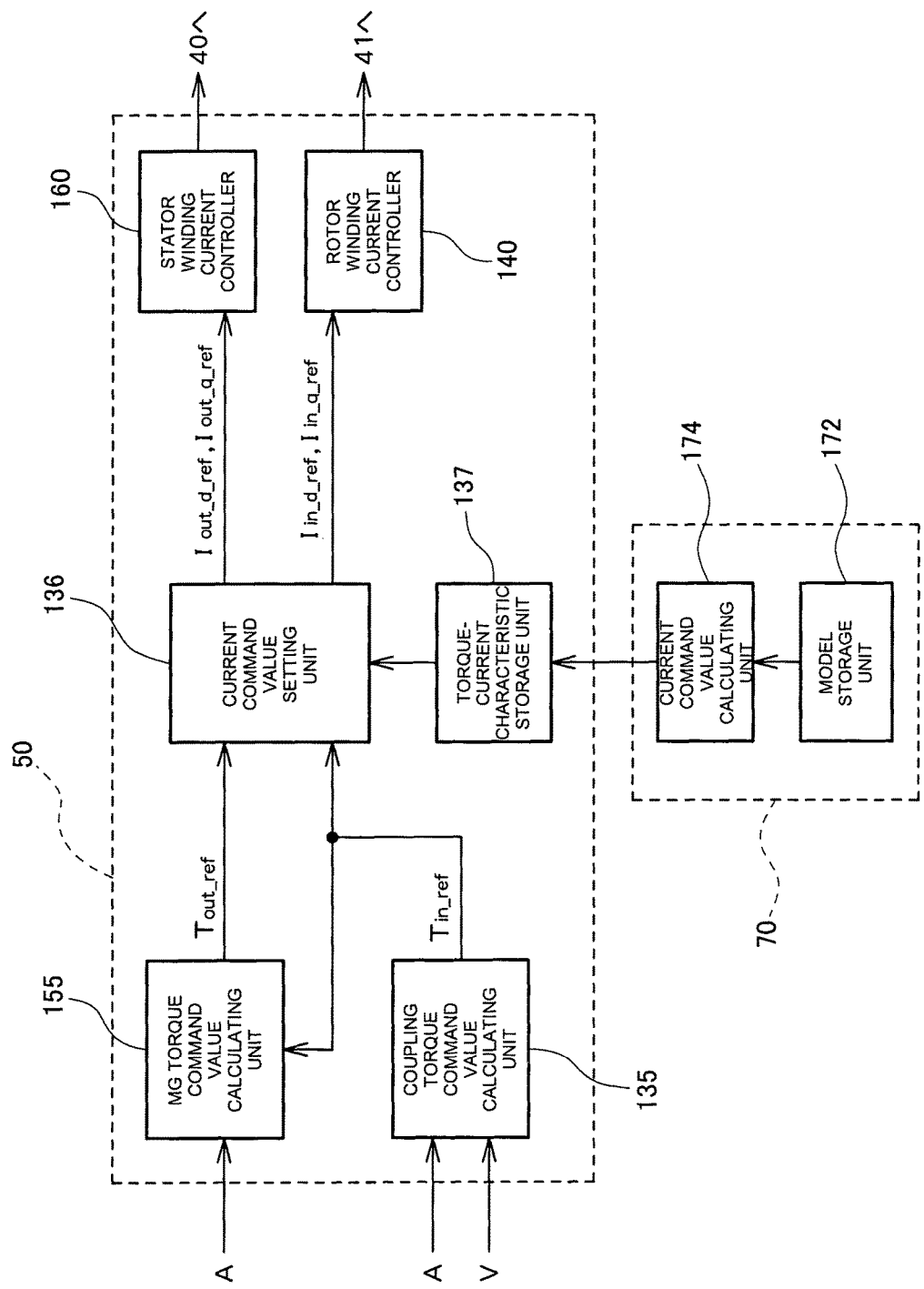
FIG. 10 is a functional block diagram showing an example structure of an electronic control unit and an information processing device.

FIG. 10 shows an example functional block diagram of the electronic control unit 50 that controls the current $I_{in}$ in the rotor winding 30 and the current $I_{out}$ in the stator winding 20 of the rotary electric machine 10. A coupling torque command value calculating unit 135 calculates a command value $T_{in\_ref}$ of the electromagnetic coupling torque acting between the input-side rotor 28 and the output-side rotor 18 based on, for example, a degree of opening of acceleration A (requested driving torque of the wheel 38) and a vehicle velocity V (rotational speed of the wheel 38). An MG torque command value calculating unit 155 calculates a command value $T_{out\_ref}$ of an MG torque acting between the stator 16 and the output-side rotor 18 based on, for example, the degree of opening of acceleration A (requested driving torque of the wheel 38) and the electromagnetic coupling torque command value $T_{in\_ref}$ calculated by the coupling torque command value calculating unit 135.

A current command value setting unit 136 sets a d-axis current command value $I_{in\_d\_ref}$ and a q-axis current command value $I_{in\_q\_ref}$ of the rotor winding 30 and a d-axis current command value $I_{out\_d\_ref}$ and a q-axis current command value $I_{out\_q\_ref}$ of the stator winding 20 based on the electromagnetic coupling torque command value $T_{in\_ref}$ calculated by the coupling torque command value calculating unit 135 and the MG torque command value $T_{out\_ref}$ calculated by the MG torque command value calculating unit 155. A torque-current characteristic storage unit 137 is formed as an information storage device, and stores a torque-current characteristic representing a relationship of a combination of the current command values ($I_{in\_d\_ref}$, $I_{in\_q\_ref}$, $T_{out\_ref}$ and $I_{out\_q\_ref}$) with respect to a combination of the torque command values ($T_{in\_ref}$ and $T_{out\_ref}$). The current command value setting unit 136 reads the torque-current characteristic stored in the torque-current characteristic storage unit 137, and sets, in the read torque-current characteristic, a combination of the current command values ($I_{in\_d\_ref}$, $I_{in\_q\_ref}$, $I_{out\_d\_ref}$, and $I_{out\_q\_ref}$) corresponding to a combination of the torque command values ($T_{in\_ref}$ and $T_{out\_ref}$).

A rotor winding current controller 140 controls the switching operation of the inverter 41 (electric power conversion at the inverter 41) so that a d-axis current $I_{in\_d}$ and a q-axis current $I_{in\_q}$ in the rotor winding 30 respectively match the d-axis current command value $I_{in\_d\_ref}$ and the q-axis current command value $I_{in\_q\_ref}$ which are set by the current command value setting unit 136. A stator winding current controller 160 controls the switching operation of the inverter 40 (electric power conversion at the inverter 40) so that a d-axis current $I_{out\_d}$ and a q-axis current $I_{out\_q}$ in the stator winding 20 respectively match the d-axis current command value $I_{out\_d\_ref}$ and the q-axis current command value $I_{out\_q\_ref}$ which are set by the current command value setting unit 136. With this configuration, a control is applied such that the electromagnetic coupling torque $T_{in}$ between the input-side rotor 28 and the output-side rotor 18 matches the torque command value $T_{in\_ref}$ and such that the MG torque $T_{out}$ between the stator 16 and the output-side rotor 18 matches the torque command value $T_{out\_ref}$.

Next, an information processing device 70 for calculating the combination of the current command values ($I_{in\_d\_ref}$, $I_{in\_q\_ref}$, $I_{out\_d\_ref}$, and $I_{out\_q\_ref}$) based on the combination of the torque command values ($T_{in\_ref}$ and $T_{out\_ref}$) of the rotary electric machine 10 will be described. The information processing device 70 may be formed as a microprocessor with a CPU as a core, and comprises a ROM that stores a processing program, a RAM that temporarily stores data, and an input/output port.

FIG. 10 shows an example functional block diagram of the information processing device 70. A model storage unit 172 stores a model equation (physical equation) for calculating a linkage magnetic flux $\Phi_{in}$ of the rotor winding 30 and a linkage magnetic flux $\Phi_{out}$ of the stator winding 20. As described above, in the rotary electric machine 10, because the magnetic flux due to the current $I_{in}$ the rotor winding 30 and the magnetic flux due to the current $I_{out}$ in the stator winding 20 magnetically interfere with each other, the linkage magnetic flux $\Phi_{in}$ of the rotor winding 30 changes not only by the current $I_{in}$ the rotor winding 30, but also by the current $I_{out}$ in the stator winding 20, and is a function of the current $I_{in}$ in the rotor winding 30 and the current $I_{out}$ in the stator winding 20. Similarly, the linkage magnetic flux $\Phi_{out}$ of the stator winding 20 is also a function of the current $I_{in}$ in the rotor winding 30 and the current $I_{out}$ in the stator winding 20. Thus, the model storage unit 172 stores a magnetic interference model (first magnetic interference model) representing a relationship of the linkage magnetic flux $\Phi_{in}$ of the rotor winding 30 with respect to the current $I_{in}$ in the rotor winding 30 and the current $I_{out}$ in the stator winding 20, and a magnetic interference model (second magnetic interference model) representing a relationship of the linkage magnetic flux $\Phi_{out}$ of the stator winding 20 with respect to the current $I_{in}$ in the rotor winding 30 and the current $I_{out}$ in the stator winding 20. A current command value calculating unit 174 reads the first and second magnetic interference models stored in the model storage unit 172, and calculates the current command values $I_{in\_d\_ref}$ and $I_{in\_q\_ref}$ of the rotor winding 30 and the current command values $I_{out\_d\_ref}$ and $I_{out\_q\_ref}$ of the stator winding 20 with respect to the given torque command values $T_{in\_ref}$ and $T_{out\_ref}$, based on an evaluation function f representing a total copper loss of the rotor winding 30 and the stator winding 20 and using the first and second magnetic interference models.

In the rotary electric machine 10, the electromagnetic coupling torque $T_{in}$ between the input-side rotor 28 and the output-side rotor 18 is represented by the following Equation (1), the MG torque $T_{out}$ between the stator 16 and the output-side rotor 18 is represented by the following Equation (2), a voltage $V_{in}$ of the rotor winding 30 is represented by the following Equation (3), a voltage $V_{out}$ of the stator winding 20 is represented by the following Equation (4), the current $I_{in}$ in the rotor winding 30 is represented by the following Equation (5), and the current $I_{out}$ in the stator winding 20 is represented by the following Equation (6). The evaluation function f representing the total copper loss of the rotor winding 30 and the stator winding 20 is represented by the following Equation (7). In Equations (1)~(7), $I_{in\_d}$ represents the d-axis current in the rotor winding 30, $I_{in\_q}$ represents the q-axis current in the rotor winding 30, $I_{out\_d}$ represents the d-axis current in the stator winding 20, $I_{out\_q}$ represents the q-axis current in the stator winding 20, $\Phi_{in\_d}$ represents the d-axis linkage magnetic flux of the rotor winding 30, $\Phi_{in\_q}$ represents the q-axis linkage magnetic flux of the rotor winding 30, $\Phi_{out\_d}$ represents the d-axis linkage magnetic flux of the stator winding 20, $\Phi_{out\_q}$ represents the q-axis linkage magnetic flux of the stator winding 20, $R_{in}$ represents a phase resistance of the rotor winding 30, $R_{out}$ represents a phase resistance of the stator winding 20, $P_{in}$ represents a number of poles of an induction electromagnetic coupling unit by the input-side rotor 28 and the output-side rotor 18, $P_{out}$ represents a number of poles of a PM motor unit by the stator 16 and the output-side rotor 18, $\omega_{in}$ represents a rotational angular speed of the input-side rotor 28, and $\omega_{out}$ represents a rotational angular speed of the output-side rotor 18.

[Equation 1]

$$T_{in} = P_{in} * (\Phi_{in\_d} I_{in\_q} - \Phi_{in\_q} I_{in\_d}) \tag{1}$$

$$T_{out} = P_{out} * (\Phi_{out\_d} I_{out\_d} - \Phi_{out\_q} I_{out\_d}) \tag{2}$$

$$V_{in} = \sqrt{(R_{in} I_{in\_d} + (\omega_{in} - \omega_{out})\Phi_{in\_d})^2 + (R_{in} I_{in\_q} + (\omega_{in} - \omega_{out})\Phi_{in\_q})^2} \tag{3}$$

$$V_{out} = \sqrt{(R_{out} I_{out\_d} + \omega_{out}\Phi_{out\_d})^2 + (R_{out} I_{out\_q} + \omega_{out}\Phi_{out\_q})^2} \tag{4}$$

$$I_{in} = \sqrt{I_{in\_d}^2 + I_{in\_q}^2} \tag{5}$$

$$I_{out} = \sqrt{I_{out\_d}^2 + I_{out\_q}^2} \tag{6}$$

$$f = R_{in} \cdot (I_{in\_d}^2 + I_{in\_q}^2) + R_{out} \cdot (I_{out\_d}^2 + I_{out\_q}^2) \tag{7}$$

In the first magnetic interference model, the d-axis linkage magnetic flux $\Phi_{in\_d}$ of the rotor winding 30 (model related to the d-axis linkage magnetic flux) can be represented by the following Equation (8) which is a function of $I_{in\_d}$, $I_{in\_q}$, $I_{out\_d}$, and $T_{out\_q}$.

[Equation 2]

$$\Phi_{in\_d}(I_{in\_d}, I_{in\_q}, I_{out\_d}, I_{out\_q}) = \tag{8}$$

$$\frac{(L_d + L_{dd} * |I_{out\_d}|) * (I_{in\_d} - C_{d2} * I_{out\_d} - f_{m'2})}{1 + (M_{dd} + M_{ddd} * |I_{out\_d}|) * |I_{in\_d} - C_{d1} * I_{out\_d} - f_{m'1}|^{kdd} +}$$
$$(M_{dq} + M_{dqd} * |I_{out\_d}|) * |I_{in\_q} + C_{q1} * I_{out\_q}|^{kdq}$$

In the numerator on the right side of Equation (8), $C_{d2}$ represents a coefficient representing a degree of the magnetic interference of the d-axis, and $f_{m'2}$ represents a d-axis magnetomotive force by the magnetomotive force of the permanent magnet 33. The term $(I_{in\_d} - C_{d2}*I_{out\_d} - f_{m'2})$ is a model equation related to the d-axis magnetomotive force in which $I_{in\_d}$ and $I_{out\_d}$ are combined with a setting ratio of $1:C_{d2}$, and represents a total sum of magnetomotive forces of the d-axis acting on the input-side rotor 28, taking into consideration the magnetic interference between the magnetomotive force due to $I_{in\_d}$ and the magnetomotive force due to $I_{out\_d}$. The term $L_d$ represents the d-axis inductance $I_{in\_d} = I_{out\_d} = 0$) of the induction electromagnetic coupling unit, $L_{dd}$ represents a change rate of the d-axis inductance of the induction electromagnetic coupling unit due to $I_{out\_d}$, and $(L_d + L_{dd}*|I_{out\_d}|)$ represents the d-axis inductance of the induction electromagnetic coupling unit at no load ($I_{in\_d} = 0$). Therefore, the numerator on the right side of Equation (8) corresponds to a product of the total sum of the magnetomotive forces of the d-axis and the d-axis inductance of the induction electromagnetic coupling unit at no load, and represents the d-axis linkage magnetic flux of the rotor winding 30 in consideration of the magnetic interference between the magnetic flux due to $I_{in\_d}$ and the magnetic flux due to $I_{out\_d}$ in the case where magnetic saturation does not occur in the d-axis magnetic circuit.

Meanwhile, in the denominator on the right side of Equation (8), $C_{d1}$ is a coefficient representing a degree of magnetic interference of the d-axis, $f_{m'1}$ is the d-axis magnetomotive force by the magnetomotive force of the permanent magnet 33, kdd is a constant unique to the induction electromagnetic coupling unit, and $|I_{in\_d} - C_{d1}*I_{out\_d} - f_{m'1}|$ represents a magnitude of a total sum of the magnetomotive forces of the d-axis. The term $M_{dd}$ represents a saturation coefficient of the d-axis magnetic circuit, $M_{ddd}$ represents a change rate of the saturation coefficient of the d-axis magnetic circuit by $I_{out\_d}$, and $(M_{dd} + M_{ddd}*|I_{out\_d}|)$ corresponds to a coefficient representing the degree of magnetic saturation of the d-axis by $I_{out\_d}$. Therefore, the term $(M_{dd} + M_{add}*|I_{out\_d}|)*|I_{in\_d} - C_{d1}*I_{out\_d} - f_{m'1}|^{kdd}$ is a model equation representing a degree of change of the d-axis linkage magnetic flux by the magnetic saturation caused by the d-axis magnetomotive force, and corresponds to a degree of magnetic saturation of the d-axis by the d-axis magnetomotive force. In addition, $C_{q1}$ is a coefficient representing a degree of the magnetic interference of the q-axis, kdq is a constant unique to the induction electromagnetic coupling unit, and $|I_{in\_q} + C_{q1}*I_{out\_q}|$ represents a magnitude of a total sum of the magnetomotive forces of the q-axis taking into consideration the magnetic interference between the magnetomotive force due to $I_{in\_q}$ and the magnetomotive force due to $I_{out\_q}$. The term $M_{dq}$ represents a saturation coefficient of the q-axis magnetic circuit, $M_{dqd}$ represents a change rate of the saturation coefficient of the q-axis magnetic circuit by $I_{out\_d}$, and $(M_{dq}+M_{dqd}*|I_{out\_d}|)$ corresponds to a coefficient representing a degree of magnetic saturation of the q-axis. Therefore, $(M_{dq}+M_{dqd}*|I_{out\_d}|)*|I_{in\_q}+C_{q1}*I_{out\_q}|^{kdq}$ is a model equation representing a degree of change of the d-axis linkage magnetic flux by the magnetic saturation caused by the q-axis magnetomotive force, and corresponds to the degree of the magnetic saturation of the d-axis by the q-axis magnetomotive force. The denominator on the right side of Equation (8) is a model equation representing a degree of change of the d-axis linkage magnetic flux by the magnetic saturation, and corresponds to the degree of the magnetic saturation of the d-axis by the d-axis and q-axis magnetomotive forces. As a result, Equation (8) represents the d-axis linkage magnetic flux of the rotor winding 30 taking into consideration the magnetic interference between the magnetic flux due to $I_{in\_d}$ and the magnetic flux due to $I_{out\_d}$ in a case where the magnetic saturation occurs in the d-axis magnetic circuit.

The term $f_{m'1}$ in the denominator on the right side of Equation (8) can be represented by the following Equation (9) which is a function of the q-axis currents $I_{in\_q}$ and $I_{out\_q}$, because the d-axis magnetomotive force changes by the magnetic saturation of the d-axis magnetic circuit by the magnetic flux due to the q-axis current. Similarly, $f_{m'2}$ in the numerator on the right side of Equation (8) can be represented by the following Equation (10), which is a function of the q-axis currents $I_{in\_q}$ and $I_{out\_q}$. In Equations (9) and (10), $C_{11}$, $C_{12}$, $C_{13}$, $C_{21}$, $C_{22}$, and $C_{23}$ are coefficients representing the degree of magnetic interference, and $f_{m'1}$ and $f_{m'2}$ are exponential functions of $(I_{in\_q}+C_{q1}*I_{out\_q})$ representing the total sum of the magnetomotive forces of the q-axis.

[Equation 3]

$$f_{m'1}=C_{11}+C_{12}*\exp\{-(I_{in\_q}+C_{q1}*I_{out\_q})^2/C_{13}\} \quad (9)$$

$$f_{m'2}=C_{21}+C_{22}*\exp\{-(I_{in\_q}+C_{q1}*I_{out\_q})^2/C_{23}\} \quad (10)$$

In addition, in the first magnetic interference model, the q-axis linkage magnetic flux $\Phi_{in\_q}$ of the rotor winding 30 (model related to the q-axis linkage magnetic flux) can be represented by the following Equation (11), which is a function of $I_{in\_d}$, $I_{in\_q}$, $I_{out\_d}$, and $I_{out\_q}$.

[Equation 4]

$$\Phi_{in\_q}(I_{in\_d}, I_{in\_q}, I_{out\_d}, I_{out\_q}) = \quad (11)$$

$$\frac{(L_q + L_{qq}*|I_{out\_q}|)*(I_{in\_q} - I_{out\_q}*f_{m'3})}{1 + (M_{qd} + M_{qdq}*|I_{out\_q}|)*|I_{in\_d} + C_{d3}*I_{out\_d} - f_0|^{kqd} + (M_{qq} + M_{qqq}*|I_{out\_q}|)*|I_{in\_q} + (C_{q30} + C_{q3}*|I_{out\_q}|)*I_{out\_q}|^{kqq}}$$

In the numerator on the right side of Equation (11), $f_{m'3}$ represents a degree of magnetic interference of the magnetomotive force due to $I_{out\_q}$ on the magnetomotive force due to $I_{in\_q}$, and represents an influence by the magnetomotive force of the permanent magnet 33. The term $(I_{in\_q}-I_{out\_q}*f_{m'3})$ is a model equation related to the q-axis magnetomotive force in which $I_{in\_q}$ and $I_{out\_q}$ are combined with a setting ratio of $1:f_{m'3}$, and represents a total sum of the magnetomotive forces of the q-axis acting on the input-side rotor 28 taking into consideration the magnetic interference between the magnetomotive force due to $I_{in\_q}$ and the magnetomotive force due to $I_{out\_q}$. The term $L_q$ represents a q-axis inductance ($I_{in\_q}=I_{out\_q}=0$) of the induction electromagnetic coupling unit, $L_{qq}$ represents a change rate of the q-axis inductance of the induction electromagnetic coupling unit by $I_{out\_q}$, and $(L_q+L_{qq}*|I_{out\_q}|)$ represents the q-axis inductance of the induction electromagnetic coupling unit at no load ($I_{in\_q}=0$). Therefore, the numerator of the right side of Equation (11) corresponds to a product of the total sum of the magnetomotive forces of the q-axis and the q-axis inductance of the induction electromagnetic coupling unit at no load, and represents the q-axis linkage magnetic flux of the rotor winding 30 taking into consideration the magnetic interference between the magnetic flux due to $I_{in\_q}$ and the magnetic flux due to $I_{out\_q}$ in a case where the magnetic saturation does not occur in the q-axis magnetic circuit.

On the other hand, in the denominator on the right side of Equation (11), $C_{d3}$ is a coefficient representing a degree of magnetic interference of the d-axis, $f_0$ represents the d-axis magnetomotive force by the magnetomotive force of the permanent magnet 33, kqd is a constant unique to the induction electromagnetic coupling unit, and $|I_{in\_d}+C_{d3}*I_{out\_d}-f_0|$ represents a magnitude of the total sum of the magnetomotive forces of the d-axis. The term $M_{qd}$ represents the saturation coefficient of the d-axis magnetic circuit, $M_{qdq}$ represents a change rate of the saturation coefficient of the d-axis magnetic circuit by $I_{out\_q}$, and $(M_{qd}+M_{qdq}*|I_{out\_q}|)$ corresponds to a coefficient representing the degree of the magnetic saturation of the d-axis by $I_{out\_q}$. Therefore, $(M_{qd}+M_{qdq}*|I_{out\_q}|)*|I_{in\_d}+C_{d3}*I_{out\_d}-f_0|^{kqd}$ is a model equation representing the degree of change of the q-axis linkage magnetic flux by the magnetic saturation caused by the d-axis magnetomotive force, and corresponds to the degree of magnetic saturation of the q-axis by the d-axis magnetomotive force. In addition, $C_{q3}$ and $C_{q30}$ are coefficients representing the degree of magnetic interference of the q-axis, kqq is a constant unique to the induction electromagnetic coupling unit, and $|I_{in\_q}+(C_{q30}+C_{q3}*|I_{out\_q}|)*|I_{out\_q}|$ represents a magnitude of the total sum of the magnetomotive forces of the d-axis. The term $M_{qq}$ represents the saturation coefficient of the q-axis magnetic circuit, $M_{qqq}$ represents a change rate of the saturation coefficient of the q-axis magnetic circuit by $I_{out\_q}$, and $(M_{qq}+M_{qqq}*|I_{out\_q}|)$ corresponds to a coefficient representing the degree of magnetic saturation of the q-axis by $I_{out\_q}$. Therefore, $(M_{qq}+M_{qqq}*|I_{out\_q}|)*|I_{in\_q}+(C_{q30}+C_{q3}*|I_{out\_q}|)*I_{out\_q}|^{kqq}$ is a model equation representing a degree of change of the q-axis linkage magnetic flux by the magnetic saturation caused by the q-axis magnetomotive force, and corresponds to the degree of magnetic saturation of the q-axis by the q-axis magnetomotive force. The denominator on the right side of Equation (11) is a model equation representing a degree of change of the q-axis linkage magnetic flux by the magnetic saturation, and corresponds to the degree of magnetic saturation of the q-axis by the d-axis and q-axis magnetomotive forces. As a result, Equation (11) represents the q-axis linkage magnetic flux of the rotor winding 30 taking into consideration the magnetic interference between the magnetic flux of $I_{in\_q}$ and the magnetic flux by $I_{out\_q}$ in a case where the magnetic saturation occurs in the q-axis magnetic circuit.

The term $f_0$ in the denominator on the right side of Equation (11) can be represented by the following Equation (12) which is a function of the q-axis currents $I_{in\_q}$ and $I_{out\_q}$, because the d-axis magnetomotive force changes by the magnetic saturation of the d-axis magnetic circuit by the magnetic flux caused by the q-axis current. In Equation (12), $C_{o10}$, $C_{o1}$, $C_{o20}$, $C_{o2}$, $C_{o30}$, $C_{o3}$, $C_{q40}$, and $C_{q4}$ are coefficients representing the degree of magnetic interference. Similarly, $f_{m'3}$ in the numerator on the right side of Equation (11) can be represented by the following Equation (13) which is a function of the d-axis currents $I_{in\_d}$ and $I_{out\_d}$, because the q-axis magnetomotive force changes by the magnetic saturation of the q-axis magnetic circuit by the magnetic flux caused by the d-axis current. In Equation (13), $C_{31}$, $C_{32}$, $C_{33}$, $C_{34}$, and $C_{d4}$ are coefficients representing the degree of the magnetic interference.

[Equation 5]

$$f_0 = (C_{o10} + C_{o1}*|I_{out\_q}|) + (C_{o20} + C_{o2}|I_{out\_q}|)* \exp\{-(I_{in\_q} + (C_{q40} + C_{q4}*|I_{out\_q}|)*I_{out\_q})^2/(C_{o30} + C_{o3}*|I_{out\_q}|)\} \quad (12)$$

$$f_{m'3} = C_{31} + C_{32}*\exp\{-(I_{in\_d} + C_{d4}*I_{out\_d} + C_{34})^2/C_{33}\} \quad (13)$$

Similarly, in the second magnetic interference model, the d-axis linkage magnetic flux $\Phi_{out\_d}$ of the stator winding 20 (model related to the d-axis linkage magnetic flux) can be represented by the following Equation (14), which is a function of $I_{in\_d}$, $I_{in\_q}$, $I_{out\_d}$, and $I_{out\_q}$.

[Equation 6]

$$\Phi_{in\_d}(I_{in\_d}, I_{in\_q}, I_{out\_d}, I_{out\_q}) = \frac{(L_d + L_{dd}*|I_{in\_d}|)*(I_{out\_d} - C_{d2}*I_{in\_d} - f_{m'2})}{1 + (M_{dd} + M_{ddd}*|I_{in\_d}|)*|I_{out\_d} - C_{d1}*I_{in\_d} - f_{m'1}|^{kdd} + (M_{dq} + M_{dqd}*|I_{in\_d}|)*|I_{out\_q} + C_{q1}*I_{in\_q}|^{kdq}} \quad (14)$$

In the numerator on the right side of Equation (14), $(I_{out\_d} - C_{d2}*I_{in\_d} - f_{m'2})$ is a model equation related to the d-axis magnetomotive force in which $I_{out\_d}$ and $I_{in\_d}$ are combined with a setting ratio of $1:C_{d2}$, and represents a total sum of the magnetomotive forces of the d-axis acting on the stator 16, taking into consideration the magnetic interference between the magnetomotive force by $I_{out\_d}$ and the magnetomotive force by $I_{in\_d}$. The term $L_d$ represents a d-axis inductance ($I_{out\_d} = I_{in\_d} = 0$) of the PM motor unit, $L_{dd}$ represents a change rate of the d-axis inductance of the PM motor unit by $I_{in\_d}$, and $(L_d + L_{dd}*|I_{in\_d}|)$ represents the d-axis inductance of the PM motor unit at no load ($I_{out\_d} = 0$). Therefore, the numerator on the right side of Equation (14) represents the d-axis linkage magnetic flux of the stator winding 20 taking into consideration the magnetic interference between the magnetic flux due to $I_{out\_d}$ and the magnetic flux due to $I_{in\_d}$ in a case where magnetic saturation does not occur in the d-axis magnetic circuit.

On the other hand, in the denominator on the right side of Equation (14), kdd is a constant unique to the PM motor unit, and $|I_{out\_d} - C_{d1}*I_{in\_d} - f_{m'1}|$ represents a magnitude of the total sum of the magnetomotive force of the d-axis. The term $M_{dd}$ represents a saturation coefficient of the d-axis magnetic circuit, $M_{ddd}$ represents a change rate of the saturation coefficient of the d-axis magnetic circuit by $I_{in\_d}$, and $(M_{dd} + M_{ddd}*|I_{in\_d}|)$ corresponds to a coefficient representing a degree of magnetic saturation of the d-axis by $I_{in\_d}$. Therefore, $(M_{dd} + M_{ddd}*|I_{in\_d}|)*|I_{out\_d} - C_{d1}*I_{in\_d}f_{m'1}|^{kdd}$ is a model equation representing the degree of change of the d-axis linkage magnetic flux by the magnetic saturation caused by the d-axis magnetomotive force, and corresponds to the degree of magnetic saturation of the d-axis by the d-axis magnetomotive force. In addition, kdq is a constant unique to the PM motor unit, and $|I_{out\_q} + C_{q1}*I_{in\_q}|$ represents the magnitude of the total sum of the magnetomotive forces of the q-axis taking into consideration the magnetic interference between the magnetomotive force due to $I_{out\_q}$ and the magnetomotive force due to $I_{in\_q}$. The term $M_{dq}$ represents a saturation coefficient of the q-axis magnetic circuit, $M_{dqd}$ represents a change rate of the saturation coefficient of the q-axis magnetic circuit by $I_{in\_d}$, and $(M_{dq} + M_{dqd}*|I_{in\_d}|)$ corresponds to a coefficient representing the degree of magnetic saturation of the q-axis by $I_{in\_d}$. Therefore, $(M_{dq} + M_{dqd}*|I_{in\_d}|)*|I_{out\_q} + C_{q1}*I_{in\_q}|^{kdq}$ is a model equation representing the degree of change of the d-axis linkage magnetic flux by the magnetic saturation caused by the q-axis magnetomotive force, and corresponds to the degree of magnetic saturation of the d-axis by the q-axis magnetomotive force. The denominator on the right side of Equation (14) is a model equation representing a degree of change of the d-axis linkage magnetic flux by the magnetic saturation, and corresponds to the degree of magnetic saturation of the d-axis by the d-axis and q-axis magnetomotive forces. As a result, Equation (14) represents the d-axis linkage magnetic flux of the stator winding 20 taking into consideration the magnetic interference between the magnetic flux due to $I_{out\_d}$ and the magnetic flux due to $I_{in\_d}$ in a case where the magnetic saturation occurs in the d-axis magnetic circuit.

The term $f_{m'1}$ in the denominator on the right side of Equation (14) can be represented by the following Equation (15), which is a function of the q-axis currents $I_{in\_q}$ and $I_{out\_q}$, because the d-axis magnetomotive force changes by the magnetic saturation of the d-axis magnetic circuit by the magnetic flux caused by the q-axis current. Similarly, $f_{m'2}$ in the numerator on the right side of Equation (14) can also be represented by the following Equation (16), which is a function of the q-axis currents $I_{in\_q}$ and $I_{out\_q}$. In Equations (15) and (16), $f_{m'1}$ and $f_{m'2}$ are functions of $(I_{out\_q} + C_{q1}*I_{in\_q})$ which represents the total sum of the magnetomotive force of the q-axis.

[Equation 7]

$$f_{m'1} = C_{11} + C_{12}*\exp\{-(I_{out\_q} + C_{q1}*I_{in\_q})^2/C_{13}\} \quad (15)$$

$$f_{m'2} = C_{21} + C_{22}*\exp\{-(I_{out\_q} + C_{q1}*I_{in\_q})^2/C_{23}\} \quad (16)$$

Similarly, in the second magnetic interference model, the q-axis linkage magnetic flux $\Phi_{out\_q}$ of the stator winding 20 (model related to the q-axis linkage magnetic flux) can be represented by the following Equation (17), which is a function of $I_{in\_d}$, $I_{in\_q}$, $I_{out\_d}$, and $I_{out\_q}$.

[Equation 8]

$$\Phi_{in\_q}(I_{in\_d}, I_{in\_q}, I_{out\_d}, I_{out\_q}) = \frac{(L_q + L_{qq}*|I_{in\_q}|)*(I_{out\_q} - I_{in\_q}*f_{m'3})}{1 + (M_{qd} + M_{qdq}*|I_{in\_q}|)*|I_{out\_d} + C_{d3}*I_{in\_d} - f_0|^{kqd} + (M_{qq} + M_{qqq}*|I_{in\_q}|)*|I_{out\_q} + (C_{q30} + C_{q3}*|I_{in\_q}|)*I_{in\_q}|^{kqq}} \quad (17)$$

In the numerator on the right side in Equation (17), $f_{m'3}$ represents the degree of magnetic interference of the magnetomotive force due to $I_{in\_q}$ on the magnetomotive force due to $I_{out\_q}$, and represents the influence by the magnetomotive force of the permanent magnet 33. The term $(I_{out\_q} - I_{in\_q}*f_{m'3})$ is a model equation related to the q-axis magnetomotive force in which $I_{out\_q}$ and $I_{in\_q}$ are combined with a setting ratio of $1:f_{m'3}$, and represents the total sum of the magnetomotive forces of the q-axis acting on the stator 16, taking into consideration the magnetic interference between the magnetomotive force due to $I_{out\_q}$ and the magnetomotive force due to $I_{in\_q}$. The term $L_q$ represents the q-axis inductance ($I_{out\_q}=I_{in\_q}=0$) of the PM motor unit, $L_{qq}$ represents a change rate of the q-axis inductance of the PM motor unit by $I_{in\_q}$, and ($L_q+L_{qq}*|I_{in\_q}|$) represents the q-axis inductance of the PM motor unit at no load ($I_{out\_q}=0$). Therefore, the numerator on the right side of Equation (17) represents the q-axis linkage magnetic flux of the stator winding 20 taking into consideration the magnetic interference between the magnetic flux due to $I_{out\_q}$ and the magnetic flux due to $I_{in\_q}$ in a case where the magnetic saturation does not occur in the q-axis magnetic circuit.

Meanwhile, in the denominator of the right side of Equation (17), kqd is a constant unique to the PM motor unit, and $|I_{out\_d}+C_{d3}*I_{in\_d}-f_0|$ represents a magnitude of a total sum of the magnetomotive forces of the d-axis. The term $M_{qd}$ represents a saturation coefficient of the d-axis magnetic circuit, $M_{qdq}$ represents a change rate of the saturation coefficient of the d-axis magnetic circuit by $I_{in\_q}$, and ($M_{qd}+M_{qdq}*|I_{in\_q}|$) corresponds to a coefficient representing the degree of magnetic saturation of the d-axis by $I_{in\_q}$. Therefore, $(M_{qd}+M_{qdq}*|I_{in\_q}|)*|I_{out\_d}+C_{d3}*I_{in\_d}-f_0|^{kqd}$ is a model equation representing the degree of change of the q-axis linkage magnetic flux by the magnetic saturation caused by the d-axis magnetomotive force, and corresponds to the degree of magnetic saturation of the q-axis by the d-axis magnetomotive force. In addition, kqq is a constant unique to the PM motor unit, and $|I_{out\_q}+(C_{q30}+C_{q3}*|I_{in\_q}|)*I_{in\_q}|$ represents a magnitude of the total sum of the magnetomotive forces of the d-axis. The term $M_{qq}$ represents a saturation coefficient of the q-axis magnetic circuit, $M_{qqq}$ represents a change rate of the saturation coefficient of the q-axis magnetic circuit by $I_{in\_q}$, and ($M_{qq}+M_{qqq}*|I_{in\_q}|$) corresponds to a coefficient representing the degree of magnetic saturation of the q-axis by $I_{in\_q}$. Therefore, $(M_{qq}+M_{qqq}*|I_{in\_q}|)*|I_{out\_q}+(C_{q30}+C_{q3}*|I_{in\_q}|)*I_{in\_q}|^{kqq}$ is a model equation representing a degree of change of the q-axis linkage magnetic flux by the magnetic saturation caused by the q-axis magnetomotive force, and corresponds to the degree of the magnetic saturation of the q-axis by the q-axis magnetomotive force. The denominator on the right side of Equation (17) is a model equation representing a degree of change of the q-axis linkage magnetic flux by the magnetic saturation, and corresponds to the degree of magnetic saturation of the q-axis by the d-axis and q-axis magnetomotive forces. As a result, Equation (17) represents the q-axis linkage magnetic flux of the stator winding 20 taking into consideration the magnetic interference between the magnetic flux due to $I_{out\_q}$ and the magnetic flux due to $I_{in\_q}$ in a case where the magnetic saturation occurs in the q-axis magnetic circuit.

The term $f_0$ in the denominator on the right side of Equation (17) can be represented by the following Equation (18), which is a function of the q-axis currents $I_{in\_q}$ and $I_{out\_q}$, because the d-axis magnetomotive force changes by the magnetic saturation of the d-axis magnetic circuit by the magnetic flux caused by the q-axis current. Similarly, $f_{m'3}$ in the numerator on the right side of Equation (17) can be represented by the following Equation (19), which is a function of the d-axis currents $I_{in\_d}$ and $I_{out\_d}$, because the q-axis magnetomotive force changes by the magnetic saturation of the q-axis magnetic circuit by the magnetic flux caused by the d-axis current.

[Equation 9]

$$f_0 = (C_{o10}+C_{o1}*|I_{in\_q}|)+(C_{o20}+C_{o2}*|I_{in\_q}|)*\exp\{-(I_{out\_q}+(C_{q40}+C_{q4}*|I_{in\_q}|)^2/(C_{o30}+C_{o3}*|I_{in\_q}|)\} \quad (18)$$

$$f_{m'3} = C_{31}+C_{32}*\exp\{-(I_{out\_d}+C_{d4}*I_{in\_d}+C_{34})^2/C_{33}\} \quad (19)$$

Figure 11:
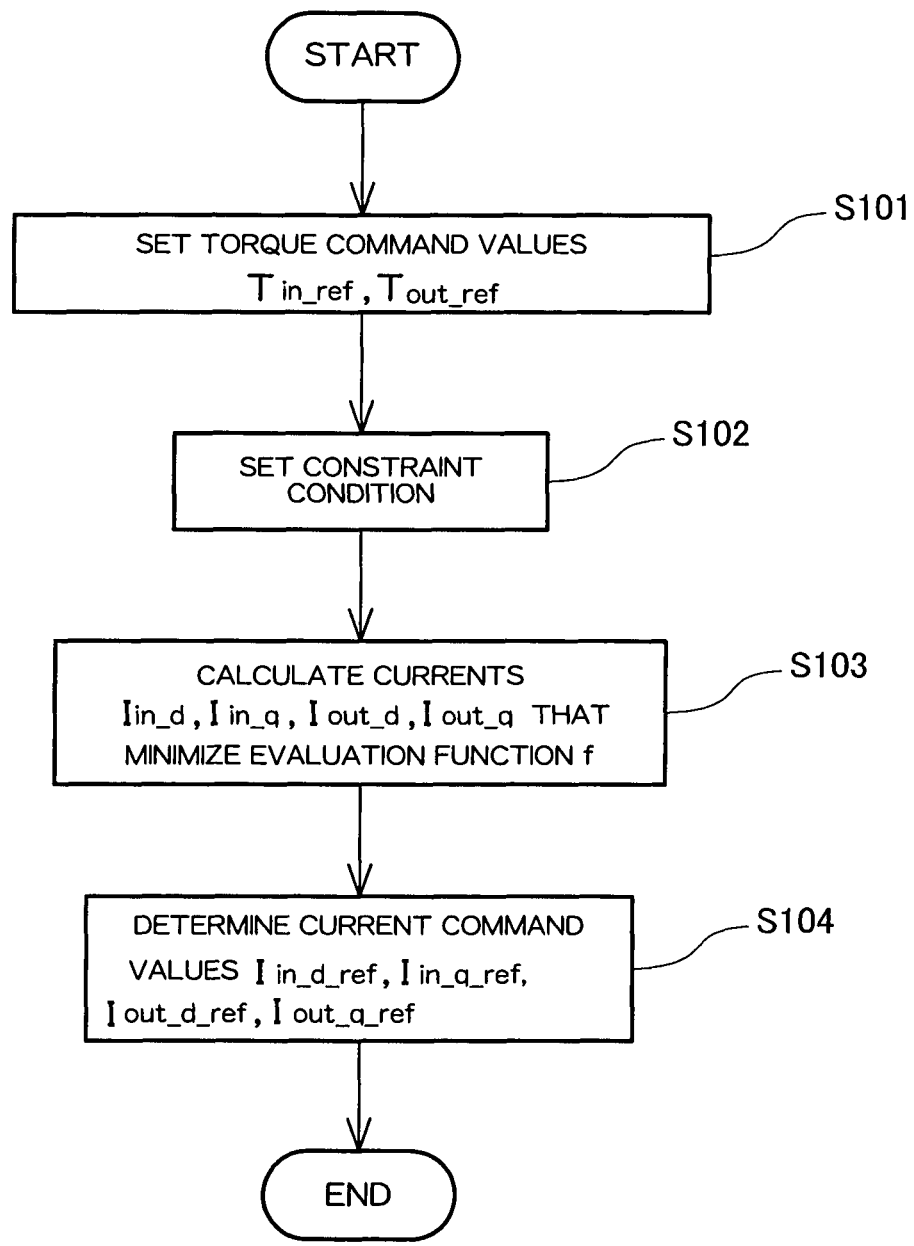
FIG. 11 is a flowchart showing an example process executed by an information processing device.

FIG. 11 is a flowchart showing an example process executed by the information processing device 70. In step S101, a combination of torque command values ($T_{in\_ref}$ and $T_{out\_ref}$) is set. In step S102, as a constraint condition, a condition is set by the current command value calculating unit 174 that the torque $T_m$ is equal to the torque command value $T_{in\_ref}$ ($T_{in}=T_{in\_ref}$) and the torque $T_{out}$ is equal to the torque command value $T_{out\_ref}$ ($T_{out}=T_{out\_ref}$) is obtained by substituting $\Phi_{in\_d}$ of Equation (8) and $\Phi_{in\_q}$ of Equation (11) (first magnetic interference model) into Equation (1), $T_{out}$ is obtained by substituting $\Phi_{out\_d}$ of Equation (14) and $\Phi_{out\_q}$ of Equation (17) (second magnetic interference model) into Equation (2), and $T_{in}$ and $T_{out}$ are functions of $I=(I_{in\_d}, I_{in\_q}, I_{out\_d}, I_{out\_q})$.

Figure 12:
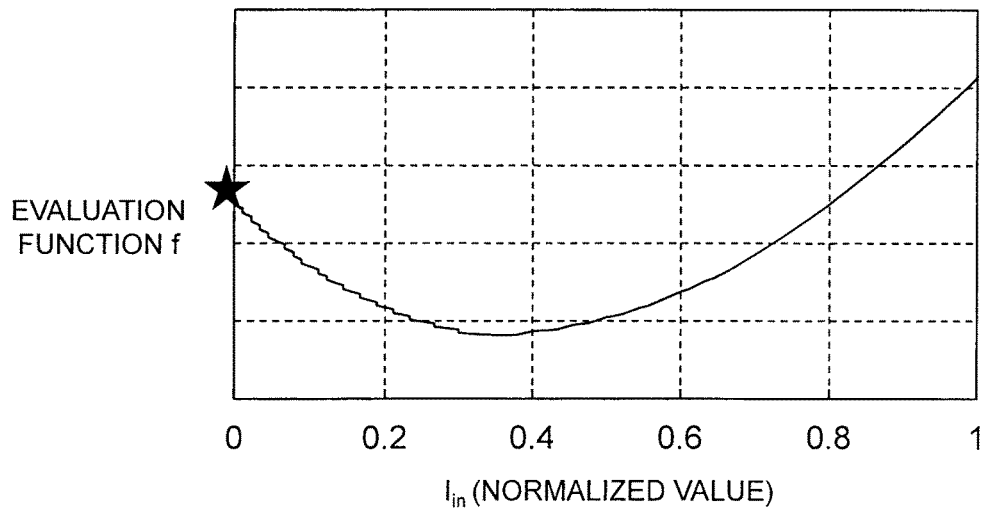
FIG. 12 is a diagram showing an example relationship of an evaluation function f with respect to a current $I_{in}$ in a rotor winding.

In step S103, the current command value calculating unit 174 calculates a combination of the currents ($I_{in\_d}, I_{in\_q}, I_{out\_d}$, and $I_{out\_q}$) that minimizes the evaluation function f representing the total copper loss of the rotor winding 30 and the stator winding 20, within the range of the constraint condition which is set in step S102. The evaluation function f is represented by Equation (7) which is a function of $I=(I_{in\_d}, I_{in\_q}, I_{out\_d}, I_{out\_q})$, and a process to calculate the value of the evaluation function f is repeated while changing the values of $I_{in\_d}, I_{in\_q}, I_{out\_d}$, and $I_{out\_q}$ within the range satisfying the constraint condition, to search for a combination of the currents ($I_{in\_d}, I_{in\_q}, I_{out\_d}$, and $I_{out\_q}$) that minimizes the evaluation function f. As an algorithm for searching the current that minimizes the evaluation function f in this process, a known technique may be employed, and thus, the algorithm will not be described in detail. For example, FIG. 12 shows the relationship of the evaluation function f with respect to the current $I_{in}$ in the rotor winding 30 under the constraint condition of $T_{in}=T_{in\_ref}=0$ and $T_{out}=T_{out\_ref}=90$ Nm. In FIG. 12 also, with regard to $I_{in}$ on the horizontal axis, the value is normalized by dividing by $I_{out}$ (current value which does not use the magnetic interference) that generates $T_{out}=90$ Nm at $I_{in}=0$. As shown in FIG. 12, with the use of the magnetic interference, there is a value of $I_{in}$ where the evaluation function f becomes smaller compared to the case of $I_{in}=0$ which does not use the magnetic interference, and, in the example configuration of FIG. 12, the evaluation function f is minimized with $I_{in}=0.34$. In step S104, the combination of the currents ($I_{in\_d}, I_{in\_q}, I_{out\_d}$, and $I_{out\_q}$) calculated in step S103 is determined by the current command value calculating unit 174 as a combination of the current command values ($I_{in\_d\_ref}, I_{in\_q\_ref}, I_{out\_d\_ref}$, and $I_{out\_q\_ref}$).

As the current command values $I_{in\_d\_ref}, I_{in\_q\_ref}, I_{out\_d\_ref}$, and $I_{out\_q\_ref}$ determined by the current command value calculating unit 174, it is not necessary to set the currents $I_{in\_d}, I_{in\_q}, I_{out\_d}$, and $I_{out\_q}$ that minimize the evaluation function f. For example, values which are slightly larger (or slightly smaller) than the currents $I_{in\_d}, I_{in\_q}, I_{out\_d}$, and $I_{out\_q}$ which result in the minimum evaluation function f may be set as the current command values $I_{in\_d\_ref}, I_{in\_q\_ref}, I_{out\_d\_ref}$, and $I_{out\_q\_ref}$.

The combination of the current command values ($I_{in\_d\_ref}, I_{in\_q\_ref}, I_{out\_d\_ref}$, and $I_{out\_q\_ref}$) calculated by the information processing device 70 (current command value calculating unit 174) is stored in correspondence to the combination of the torque command values ($T_{in\_ref}$ and $T_{out\_ref}$) as the torque-current characteristic in the torque-current characteristic storage unit 137 of the electronic control unit 50. In other words, the torque-current characteristic that minimizes (or approximately minimizes) the evaluation function f is stored in the torque-current characteristic storage unit 137. In the rotor winding current controller 140 and the stator winding current controller 160 of the electronic control unit 50, the current $I_{in}$ in the rotor winding 30 and the current $I_{out}$ in the stator winding 20 are respectively controlled based on the relationship of the current command values $I_{in\_q\_ref}$ and $I_{in\_q\_ref}$ for the rotor winding 30 and the current command values $I_{out\_d\_ref}$ and $I_{out\_q\_ref}$ for the stator winding 20 with respect to the torque command values $T_{in\_ref}$ and $T_{out\_ref}$, calculated by the information processing device 70 (current command value calculating unit 174). With this configuration, the torques $T_{in}$ and $T_{out}$ follow the torque command values $T_{in\_ref}$ and $T_{out\_ref}$, respectively, and the current $I_{in}$ in the rotor winding 30 and the current $I_{out}$ in the stator winding 20 are controlled so that the total copper loss of the rotor winding 30 and the stator winding 20 is minimum (or approximately minimum).

As described, in the rotary electric machine 10, when the magnetic interference between the magnetic flux due to the current $I_{in}$ in the rotor winding 30 and the magnetic flux due to the current $I_{out}$ in the stator winding 20 is used, there are infinite combinations of the currents ($I_{in}$ and $I_{out}$) for matching the torques $T_{in}$ and $T_{out}$ with the torque command values $T_{in\_ref}$ and $T_{out\_ref}$, respectively. In this regard, in the present embodiment, from the infinite combinations, a combination of the current command values ($I_{in\_d\_ref}$, $I_{in\_q\_ref}$, $I_{out\_d\_ref}$, and $I_{out\_q\_ref}$) that minimizes (or approximately minimizes) the total copper loss of the rotor winding 30 and the stator winding 20 can be selected using the first and second magnetic interference models. By controlling the current $I_{in}$ in the rotor winding 30 and the current $I_{out}$ in the stator winding 20 based on the current command values $I_{in\_ref}$, $I_{out\_d\_ref}$, and $I_{out\_q\_ref}$, it is possible to improve a power factor of the rotary electric machine 10 compared to the case where the magnetic interference is not used, and the loss by the copper loss of the rotary electric machine 10 can be reduced.

In the present embodiment, the electronic control unit 50 may also function as the information processing device 70, and the process in the flowchart of FIG. 11 may be executed by the electronic control unit 50. In a functional block diagram of FIG. 13, the current command value setting unit 136 also functions as the current command value calculating unit 174, and calculates the combination of the current command values ($I_{in\_d\_ref}$, $I_{in\_q\_ref}$, $I_{out\_d\_ref}$, and $I_{out\_q\_ref}$) that minimizes (or approximately minimizes) the evaluation function f using the first and second magnetic interference models stored in the model storage unit 172. In the rotor winding current controller 140 and the stator winding current controller 160, the current $I_{in}$ in the rotor winding 30 and the current $I_{out}$ in the stator winding 20 are respectively controlled based on the current command values $I_{in\_d\_ref}$ and $I_{in\_q\_ref}$ for the rotor winding 30 and the current command values $T_{out\_d\_ref}$ and $I_{out\_q\_ref}$ for the stator winding 20 calculated by the current command value setting unit 136. In this case, the torque-current characteristic storage unit 137 may be omitted.

As the constraint condition which is set in step S102 in the flowchart of FIG. 11, in addition to the conditions of $T_{in}=T_{in\_ref}$ and $T_{out}=T_{out\_ref}$, other conditions may be added such as that the voltage $V_{in}$ of the rotor winding 30 is less than or equal to a limit value (first limit value) $V_{in\_limit}$ ($V_{in} \leq V_{in\_limit}$) and that the voltage $V_{out}$ of the stator winding 20 is less than or equal to a limit value (second limit value) $V_{out\_limit}$ ($V_{out} \leq V_{out\_limit}$). The voltage $V_{in}$ can be obtained by substituting $\Phi_{in\_d}$ of Equation (8) and $\Phi_{in\_q}$ of Equation (11) (first magnetic interference model) into Equation (3), and is a function of $I=(I_{in\_d}, I_{in\_q}, I_{out\_d}, I_{out\_q})$ and $\omega_{in}$ and $\omega_{out}$. The voltage $V_{out}$ can be obtained by substituting $\Phi_{out\_d}$ in Equation (14) and $\Phi_{out\_q}$ in Equation (17) (second magnetic interference model) into Equation (2), and is a function of I and $\omega_{out}$. For $\omega_{in}$ and $\omega_{out}$, values detected by a rotational angular speed sensor are used, and the limit values $V_{in\_limit}$ and $V_{out\_limit}$ are set to values, for example, lower than the voltage of the electricity storage device 42. By adding the constraint conditions of $V_{in} \leq V_{in\_limit}$ and $V_{out} \leq V_{out\_limit}$, it is possible to reduce the loss by the copper loss of the rotary electric machine 10 while inhibiting the counter electromotive force of the rotor winding 30 and the counter electromotive force of the stator winding 20.

Alternatively, as the constraint condition, conditions may be added that the current $I_{in}$ in the rotor winding 30 is less than or equal to a limit value (third limit value) $I_{in\_limit}$ ($I_{in} \leq I_{in\_limit}$) and that the current $I_{out}$ in the stator winding 20 is less than or equal to a limit value (fourth limit value) $I_{out\_limit}$ ($I_{out} \leq I_{out\_limit}$). The current $I_{in}$ is represented by Equation (5), which is a function of $I_{in\_d}$ and $I_{in\_q}$, and the current $I_{out}$ is represented by Equation (6) which is a function of $I_{out\_d}$ and $I_{out\_q}$. The limit value $I_{in\_limit}$ is set, for example, to a value less than a capacity of the inverter 41, and the limit value $I_{out\_limit}$ is set, for example, to a value less than a capacity of the inverter 40. By adding the constraint conditions of $I_{in} \leq I_{in\_limit}$ and $I_{out} \leq I_{out\_limit}$, it is possible to reduce the loss by the copper loss of the rotary electric machine 10 while inhibiting the current $I_{in}$ in the rotor winding 30 and the current $I_{out}$ in the stator winding 20.

Alternatively, as the constraint conditions, conditions may be added that $V_{in} \leq V_{in\_limit}$ and $I_{in} \leq I_{in\_limit}$. With such a configuration, the loss by the copper loss of the rotary electric machine 10 can be reduced while inhibiting the counter electromotive force of the rotor winding 30 and the current $I_{in}$. Alternatively, as the constraint conditions, the conditions of $V_{out} \leq V_{out\_limit}$ and $I_{out} \leq I_{out\_limit}$ may be added. With such a configuration, the loss by the copper loss of the rotary electric machine 10 can be reduced while inhibiting the counter electromotive force of the stator winding 20 and the current $I_{out}$.

Figure 13:
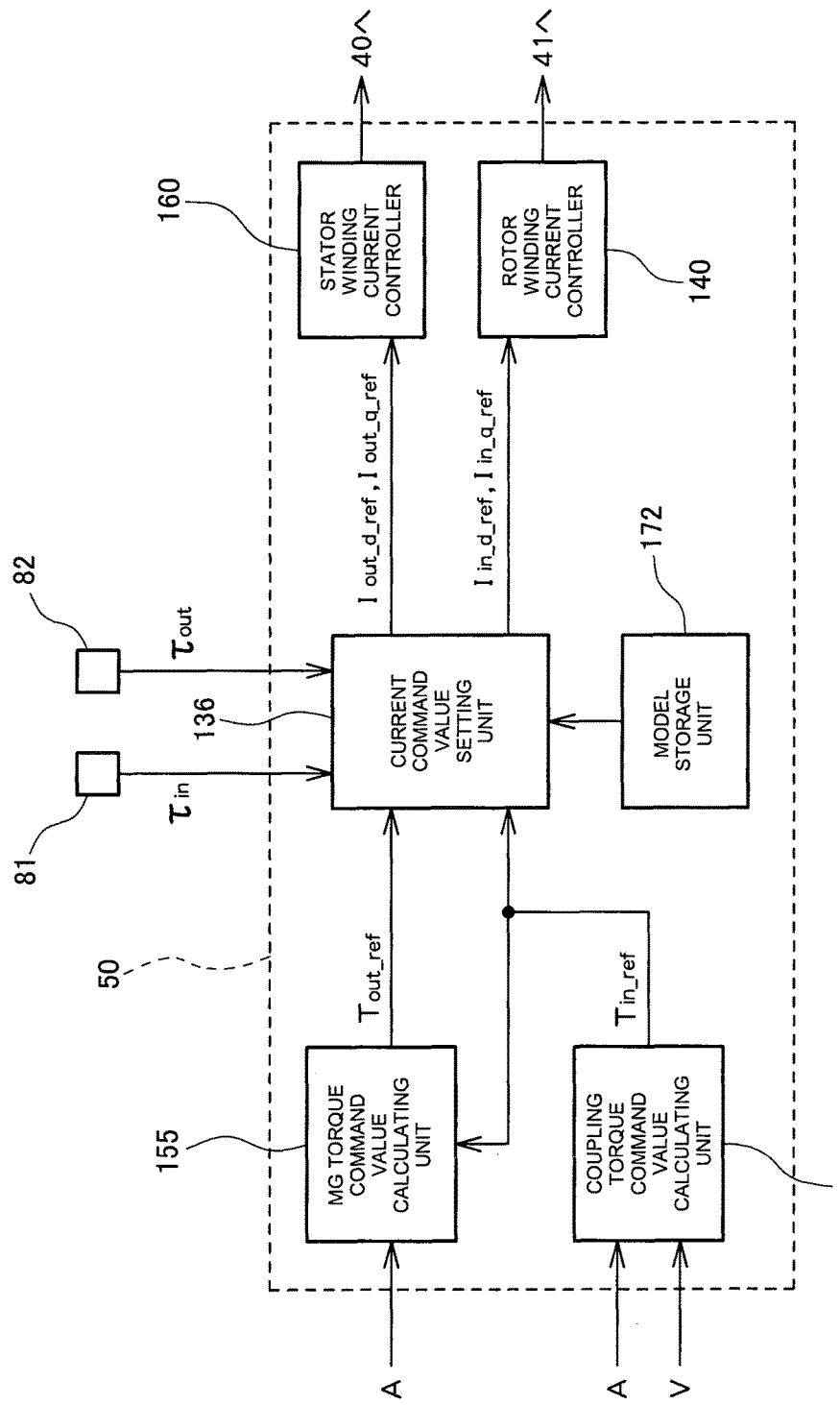
FIG. 13 is a functional block diagram showing another example structure of an electronic control unit.

Alternatively, in the evaluation function f of Equation (7) representing the total copper loss of the rotor winding 30 and the stator winding 20, the phase resistance $R_{out}$ of the rotor winding 30 and the phase resistance $R_{out}$ of the stator winding 20 may be changed according to a temperature $\tau_{in}$ of the rotor winding 30 and the temperature $T_{out}$ of the stator winding 20, respectively. In this case, as shown in FIG. 13, a rotor winding temperature sensor 81 which detects the temperature $\tau_{out}$ of the rotor winding 30 and a stator winding temperature sensor 82 which detects the temperature $\tau_{out}$ of the stator winding 20 are provided in the rotary electric machine 10. In the current command value setting unit 136, the phase resistance $R_{in}$ of the rotor winding 30 is set based on the temperature $\tau_{in}$ of the rotor winding 30 detected by the rotor winding temperature sensor 81, and the phase resistance $R_{out}$ of the stator winding 20 is set based on the temperature $\tau_{out}$ of the stator winding 20 detected by the stator winding temperature sensor 82. The value of the evaluation function f is calculated using the phase resistances $R_{in}$ and $R_{out}$ which are set based on the temperatures $\tau_{in}$ and $\tau_{out}$. According to such an example structure, the copper loss of the rotary electric machine 10 which changes according to the temperature $\tau_{in}$ of the rotor winding 30 and the temperature $\tau_{out}$ of the stator winding 20 can be more precisely minimized.

The first and second magnetic interference models are not limited to those described above, and various modifications and simplifications are possible. For example, the denominator on the right side of Equation (8) may be simplified by setting kdd=1 and kdq=1, and, the denominator on the right side of Equation (11) may be simplified by setting kqd=1 and kqq=1. Similarly, the denominator on the right side of Equation (14) may be simplified by setting kdd=1 and kdq=1, and the denominator on the right side of Equation (17) may be simplified by setting kqd=1 and kqq=1.

Moreover, in Equations (9), (10), (12), and (13), the part of the exponential function may be approximated by a polynomial equation. Alternatively, each of $f_{m'1}$, $f_{m'2}$, and $f_0$ may be simplified to a constant assuming that the d-axis magnetomotive force by the magnetomotive force of the permanent magnet 33 is a constant, and $f_{m'3}$ may be simplified to a constant assuming that the degree of the magnetic interference of the magnetomotive force due to $I_{out\_q}$ on the magnetomotive force due to $I_{in\_q}$ is constant.

In addition, assuming that, from FIGS. 5-8, the degree of magnetic interference at the q-axis between the magnetomotive force due to $I_{in\_q}$ and the magnetomotive force due to $I_{out\_q}$ is sufficiently small compared to the degree of magnetic interference at the d-axis between the magnetomotive force due to $I_{in\_d}$ and the magnetomotive force due to $I_{out\_d}$, it is possible to simplify the denominator on the right side of Equation (8) by setting $C_{q1}=0$, simplify the denominator on the right side of Equation (11) by setting $C_{q3}=C_{q30}=0$, and simplify the numerator on the right side of Equation (11) by setting $f_{m3}=0$. Similarly, the denominator on the right side of Equation (14) may be simplified by setting $C_{q1}=0$, the denominator on the right side of Equation (17) may be simplified by setting $C_{q3}=C_{q30}=0$, and the numerator on the right side of Equation (17) may be simplified by setting $f_{m3}=0$.

Moreover, the numerator of the right side of Equation (8) may be simplified by setting $L_{dd}=0$ assuming that the d-axis inductance of the induction electromagnetic coupling unit is constant, and the numerator on the right side of Equation (11) may be simplified by setting $L_{qq}=0$ assuming that the q-axis inductance of the induction electromagnetic coupling unit is a constant. Similarly, the numerator on the right side of Equation (14) may be simplified by setting $L_{dd}=0$ assuming that the d-axis inductance of the PM motor unit is a constant, and the numerator on the right side of Equation (17) may be simplified by setting $L_{qq}=0$ assuming that the q-axis inductance of the PM motor unit is a constant.

Furthermore, the denominator on the right side of Equation (8) may be simplified by setting $M_{ddd}=0$ assuming that the saturation coefficient of the d-axis magnetic circuit is a constant, and by setting $M_{dqd}=0$ assuming that the saturation coefficient of the q-axis magnetic circuit is a constant. The denominator on the right side of Equation (11) may be simplified by setting $M_{qdq}=0$ assuming that the saturation coefficient of the d-axis magnetic circuit is a constant, and by setting $M_{cm}=0$ assuming that the saturation coefficient of the q-axis magnetic circuit is a constant. Similarly, the denominator on the right side of Equation (14) may be simplified by setting $M_{ddd}=0$ assuming that the saturation coefficient of the d-axis magnetic circuit is a constant, and by setting $M_{dqd}=0$ assuming that the saturation coefficient of the q-axis magnetic circuit is a constant. The denominator on the right side of Equation (17) may be simplified by setting $M_{qdq}=0$ assuming that the saturation coefficient of the d-axis magnetic circuit is a constant, and by setting $M_{qqq}=0$ assuming that the saturation coefficient of the q-axis magnetic circuit is a constant.

Further, the denominator on the right side of Equation (8) may be simplified by setting $M_{dq}=M_{dqd}=0$ assuming that the influence of the q-axis magnetomotive force on the magnetic saturation of the d-axis is sufficiently small compared to the d-axis magnetomotive force, and the denominator on the right side of Equation (11) may be simplified by setting $M_{qd}=M_{qdq}=0$ assuming that the influence of the d-axis magnetomotive force on the magnetic saturation of the q-axis is sufficiently small compared to the q-axis magnetomotive force. Similarly, the denominator on the right side of Equation (14) may be simplified by setting $M_{dq}=M_{dqd}=0$ assuming that the influence of the q-axis magnetomotive force on the magnetic saturation of the d-axis is sufficiently small compared to the d-axis magnetomotive force, and the denominator on the right side of Equation (17) may be simplified by setting $M_{qd}=M_{qdq}=0$ assuming that the influence of the d-axis mangetomotive force on the magnetic saturation of the q-axis is sufficiently small compared to the q-axis magnetomotive force.

Further, the denominator on the right side of Equation (8) may be simplified to 1 by setting ($M_{dd}=M_{ddd}=M_{dq}=M_{dqd}=0$) by not taking into consideration the magnetic saturation of the d-axis, and the denominator on the right side of Equation (11) may be simplified to 1 by setting ($M_{qd}=M_{qdq}=M_{qq}=M_{qqq}=0$) by not taking into consideration the magnetic saturation of the q-axis. Similarly, the denominator on the right side of Equation (14) may be simplified to 1 by not taking into consideration the magnetic saturation of the d-axis, and the denominator on the right side of Equation (17) may be simplified to 1 by not taking into consideration the magnetic saturation of the q-axis.

The first and second magnetic interference models are not limited to the equation models described above, and may be, for example, in the form of a map of each linkage magnetic flux for each current which can be obtained by magnetic field analysis or a rational function model in which the denominator and the numerator are represented with polynomial equations of an arbitrary order with respect to each current.

Figure 14:
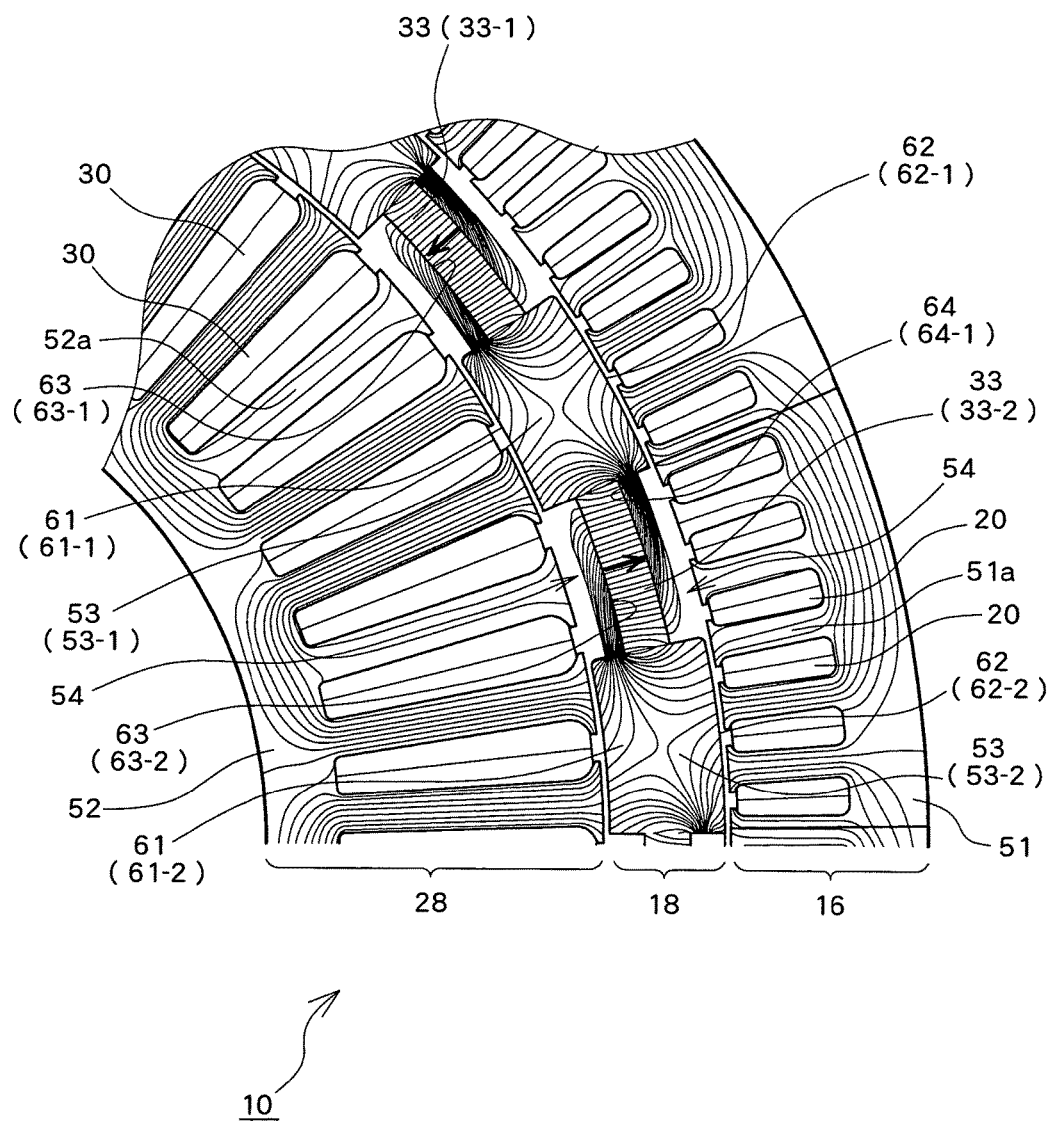
FIG. 14 is a diagram showing another example structure of a rotary electric machine.

Furthermore, the rotary electric machine 10 is not particularly limited to the structure described above or a magnet placement structure such as the structure of FIG. 6 of Patent Document 3, so long as the linkage magnetic flux of the stator winding 20 can be adjusted by the current in the rotor winding 30 and the linkage magnetic flux of the rotor winding 30 can be adjusted by the current in the stator winding 20. For example, with regard to the permanent magnet 33 placed between soft magnetic members 53 adjacent in the circumferential direction of the rotor, as shown in FIG. 14, a placement may be employed in which an inclination angle of the magnetic pole surface with respect to the radial direction is 90°. FIG. 14 also shows the flow of the field magnetic flux by the permanent magnet 33, similar to FIG. 4. Alternatively, the magnetic pole surfaces of the permanent magnets 33 may be placed along the radial direction.

Figure 15:
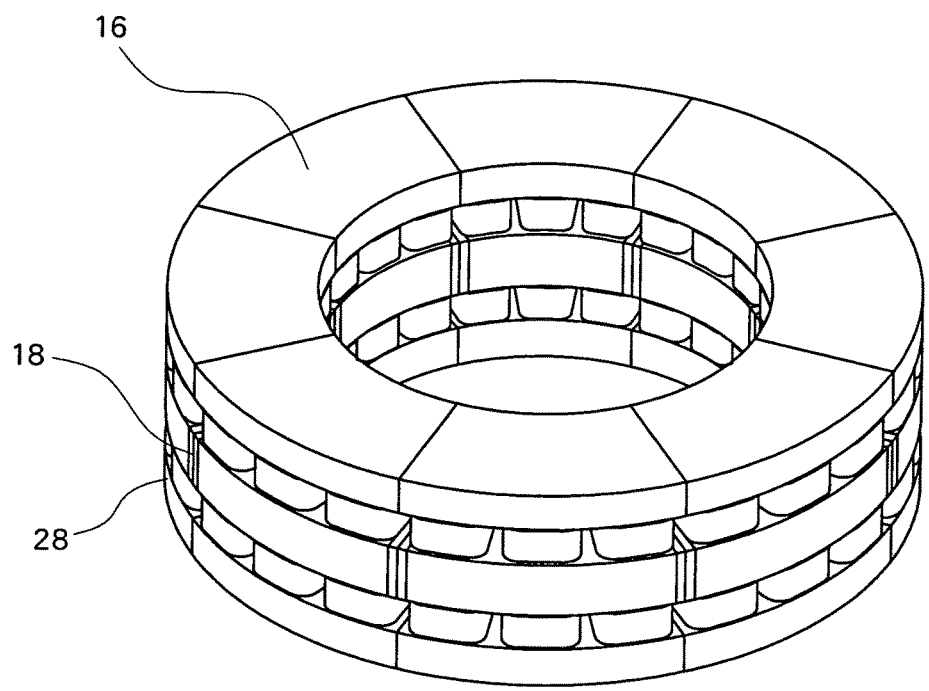
FIG. 15 is a diagram showing another example structure of a rotary electric machine.
Figure 16:
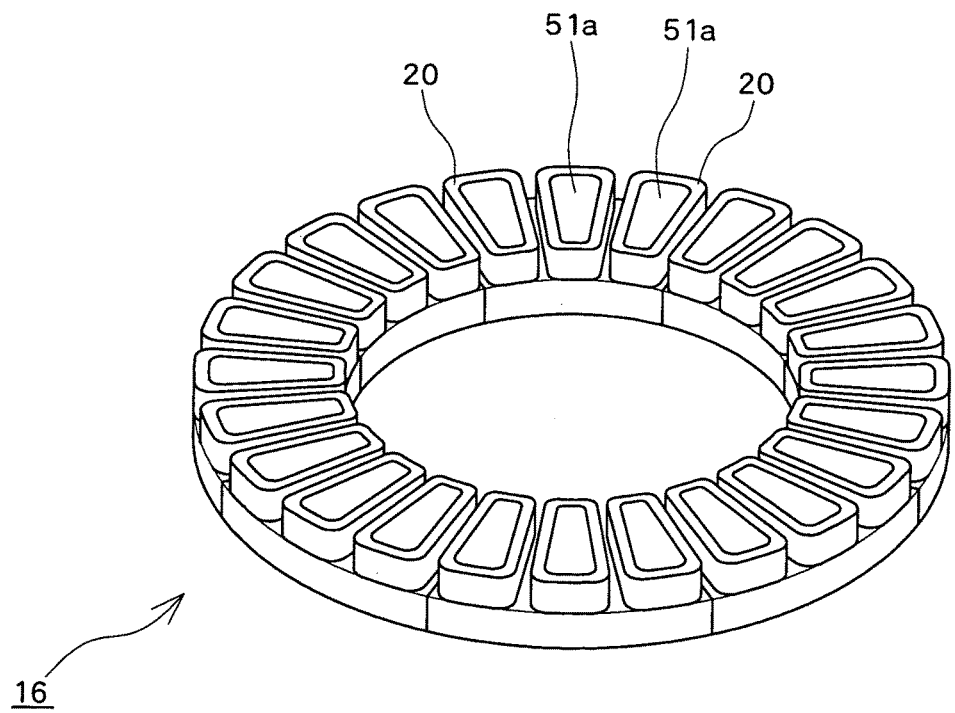
FIG. 16 is a diagram showing another example structure of a rotary electric machine.
Figure 17:
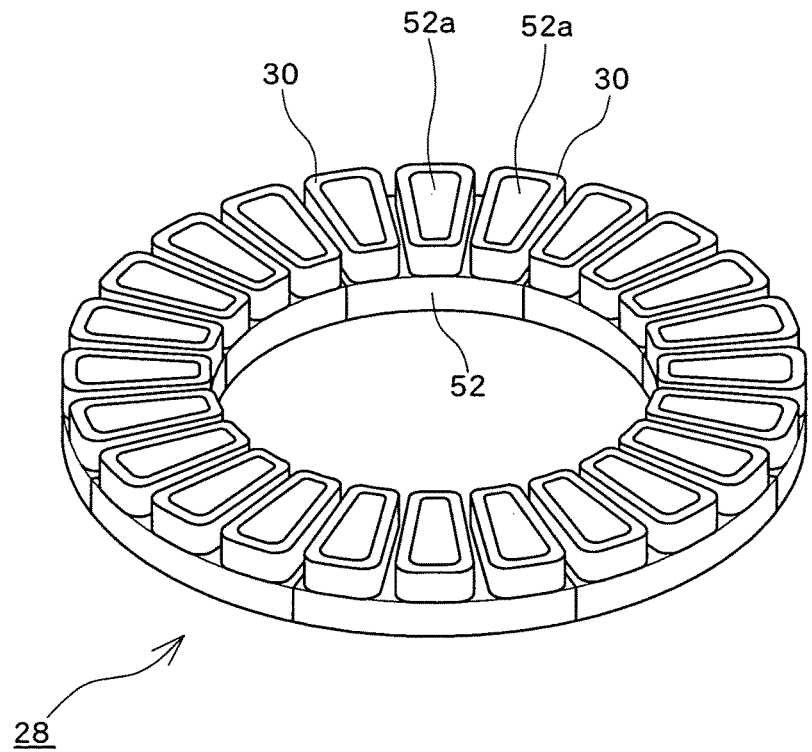
FIG. 17 is a diagram showing another example structure of a rotary electric machine.
Figure 18:
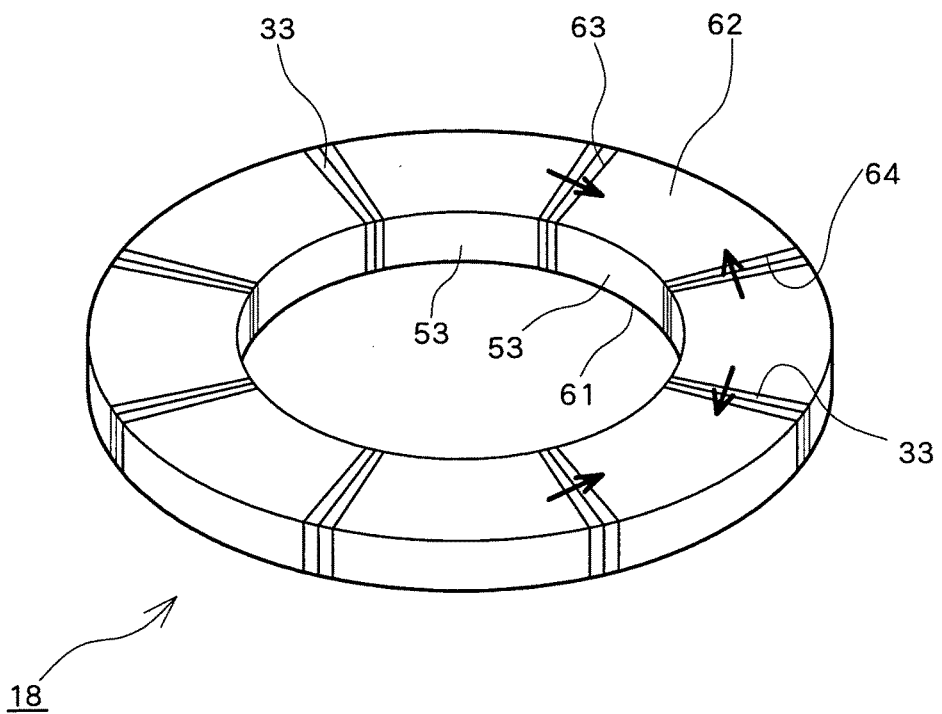
FIG. 18 is a diagram showing another example structure of a rotary electric machine.

Alternatively, as shown in FIGS. 15-18, for example, a configuration may be employed in which an axial type rotary electric machine 10 is provided in which the output-side rotor 18 opposes the input-side rotor 28 and the stator 16 in the rotor rotational axis direction. FIG. 15 shows an example structure of the axial type rotary electric machine 10, FIG. 16 shows an example structure of the stator 16, FIG. 17 shows an example structure of the input-side rotor 28, and FIG. 18 shows an example structure of the output-side rotor 18. Each of the plurality of soft magnetic members 53 placed in a divided manner in the circumferential direction of the rotor with an equal space therebetween comprises a lower surface (first surface) 61 which opposes the input-side rotor 28 (teeth 52a) with a predetermined gap therebetween, an upper surface (second surface) 62 which opposes the stator 16 (teeth 51a) with a predetermined gap therebetween, a side surface (third surface) 63 which faces (contacts) a magnetic pole surface of one permanent magnet 33 of adjacent permanent magnets 33, and a side surface (fourth surface) 64 which faces (contacts) the magnetic pole surface of the other permanent magnet 33 of the adjacent permanent magnets 33. In the example configuration of FIG. 18, the magnetic pole surface of each permanent magnet 33 is placed along the radial direction.

Figure 19:
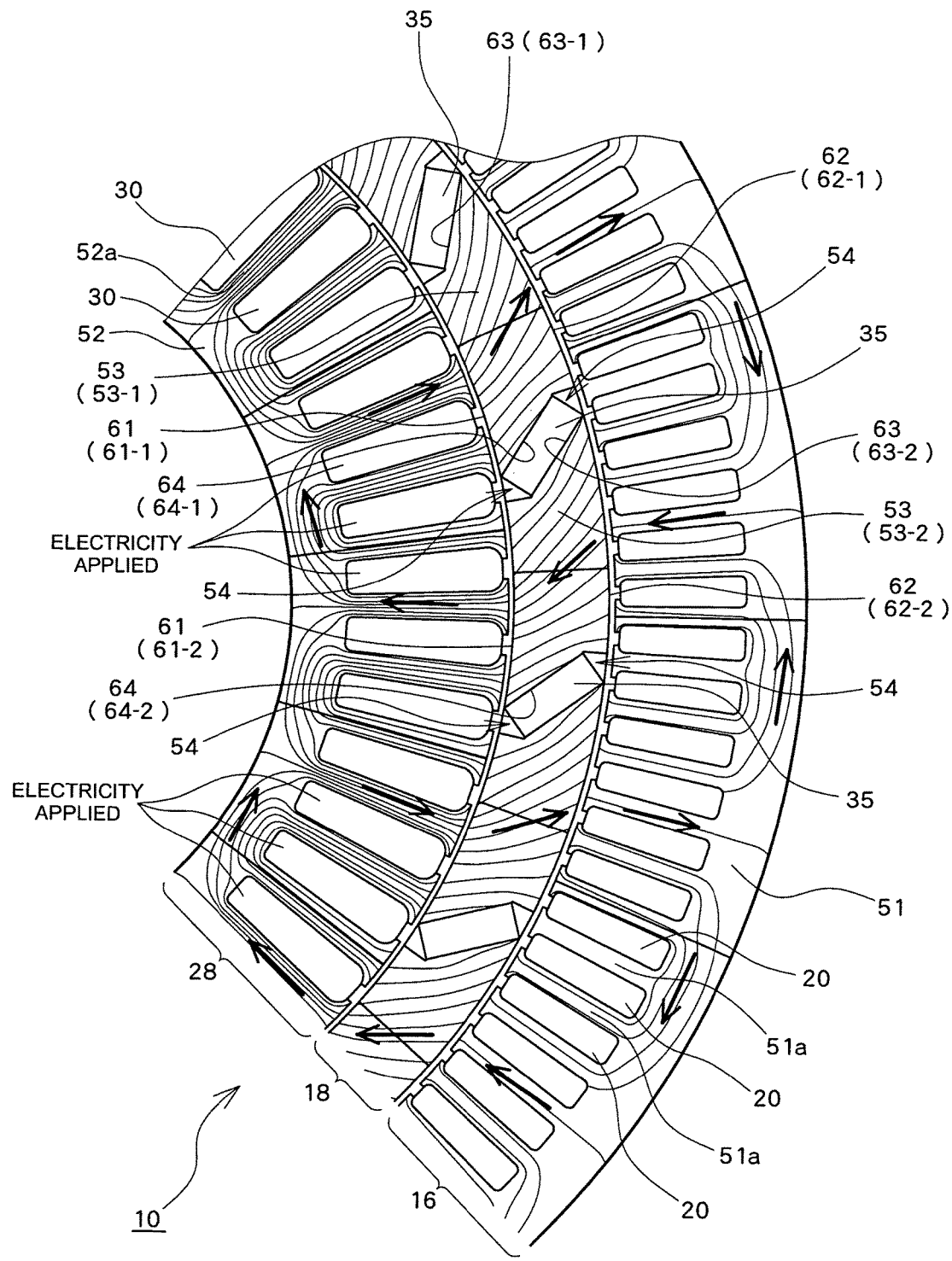
FIG. 19 is a diagram showing another example structure of a rotary electric machine.

In addition, in the output-side rotor 18, for example, as shown in FIG. 19, a non-magnetic member 35 may be provided in place of the permanent magnet 33. In the example configuration of FIG. 19, the plurality of soft magnetic members 53 are placed in a divided manner in the circumferential direction of the rotor with a space therebetween (with equal space). A plurality (same number as that of the soft magnetic members 53) of non-magnetic members 35 are placed in the circumferential direction of the rotor with a space therebetween (with equal space), and each non-magnetic member 35 is placed between soft magnetic members 53 adjacent in the circumferential direction of the rotor. Each of the soft magnetic members 53 placed between the non-magnetic members 35 adjacent in the circumferential direction of the rotor comprises an inner circumferential surface (first surface) 61 which opposes the input-side rotor 28 (teeth 52a) with a predetermined gap therebetween, an outer circumferential surface (second surface) 62 which opposes the stator 16 (teeth 51a) with a predetermined gap therebetween, a side surface (third surface) 63 which faces (contacts) one non-magnetic member 35 of the adjacent non-magnetic members 35, and a side surface (fourth surface) 64 which faces (contacts) the other non-magnetic member 35 of the adjacent non-magnetic members, and a magnetic flux passes between the inner circumferential surface 61 and the outer circumferential surface 62. In place of the non-magnetic member 35, it is also possible to provide a gap. Alternatively, the soft magnetic members 53 adjacent in the circumferential direction of the rotor may be connected to each other by a bridge.

As shown in FIG. 19, the d-axis magnetic flux due to the d-axis current in the rotor winding 30 flows between the inner circumferential surface 61 and the outer circumferential surface 62 of the soft magnetic member 53, and acts on the stator 16, to affect the linkage magnetic flux to the stator winding 20. Because of this, the d-axis magnetic flux due to the d-axis current in the rotor winding 30 acts, for the stator 16, similar to the field magnetic flux when the permanent magnet 33 is provided in the position of the non-magnetic member 35. Therefore, the linkage magnetic flux of the stator winding 20 can be adjusted by the current in the rotor winding 30. Similarly, the d-axis magnetic flux due to the d-axis current in the stator winding 20 flows between the outer circumferential surface 62 and the inner circumferential surface 61 of the soft magnetic member 53 and acts on the input-side rotor 28, to affect the linkage magnetic flux to the rotor winding 30. Because of this, the d-axis magnetic flux due to the d-axis current in the stator winding 20 acts, for the input-side rotor 28, similarly as the field magnetic flux when the permanent magnet 33 is provided at the position of the non-magnetic member 35. Therefore, the linkage magnetic flux of the rotor winding 30 can be adjusted by the current in the stator winding 20.

For the first and second magnetic interference models when the non-magnetic member 35 or the gap is provided in place of the permanent magnet 33, it is possible to consider a configuration where $f_{m'1}=f_{m'2}=f_0=0$ in the above description.

A preferred embodiment of the present invention has been described. The present invention, however, is not limited to the embodiment in any ways, and various modifications are possible within the scope and spirit of the present invention.

EXPLANATION OF REFERENCE NUMERALS

10 ROTARY ELECTRIC MACHINE; 16 STATOR; 18 OUTPUT-SIDE ROTOR (SECOND ROTOR); 20 STATOR WINDING; 28 INPUT-SIDE ROTOR (FIRST ROTOR); 30 ROTOR WINDING; 33 PERMANENT MAGNET; 35 NON-MAGNETIC MEMBER; 36 ENGINE; 37 DRIVE SHAFT; 38 WHEEL; 40, 41 INVERTER; 42 ELECTRICITY STORAGE DEVICE; 44 TRANSMISSION; 50 ELECTRONIC CONTROL UNIT; 51 STATOR CORE; 52 ROTOR CORE; 53 SOFT MAGNETIC MEMBER; 54 GAP; 61 INNER CIRCUMFERENTIAL SURFACE (FIRST SURFACE); 62 OUTER CIRCUMFERENTIAL SURFACE (SECOND SURFACE); 63, 64 SIDE SURFACE (THIRD SURFACE, FOURTH SURFACE); 70 INFORMATION PROCESSING DEVICE; 81 ROTOR WINDING TEMPERATURE SENSOR; 82 STATOR WINDING TEMPERATURE SENSOR; 95 SLIP RING; 96 BRUSH; 135 COUPLING TORQUE COMMAND VALUE CALCULATING UNIT; 136 CURRENT COMMAND VALUE SETTING UNIT; 137 TORQUE-CURRENT CHARACTERISTIC STORAGE UNIT; 140 ROTOR WINDING CURRENT CONTROLLER; 155 MG TORQUE COMMAND VALUE CALCULATING UNIT; 160 STATOR WINDING CURRENT CONTROLLER; 172 MODEL STORAGE UNIT; 174 CURRENT COMMAND VALUE CALCULATING UNIT.

The invention claimed is:

1. An information processing device that calculates a current command value based on a torque command value of a rotary electric machine, wherein
the rotary electric machine comprises a first rotor in which a rotor winding is provided, a stator in which a stator winding is provided, and a second rotor that opposes the first rotor and the stator and that is rotatable relative to the first rotor,
a torque acts between the first rotor and the second rotor according to a magnetic flux due to a current in the rotor winding acting on the second rotor, and a torque acts between the stator and the second rotor according to a magnetic flux due to a current in the stator winding acting on the second rotor,
a linkage magnetic flux of the stator winding can be adjusted by the current in the rotor winding and a linkage magnetic flux of the rotor winding can be adjusted by the current in the stator winding,
the information processing device comprises a current command value calculating unit that calculates a current command value for the rotor winding and a current command value for the stator winding with respect to a torque command value between the first rotor and the second rotor and a torque command value between the stator and the second rotor, based on an evaluation function representing a total copper loss of the rotor winding and the stator winding and using a first magnetic interference model and a second magnetic interference model,
the first magnetic interference model represents a relationship of the linkage magnetic flux of the rotor winding with respect to the current in the rotor winding and the current in the stator winding, and the second magnetic interference model represents a relationship of the linkage magnetic flux of the stator winding with respect to the current in the rotor winding and the current in the stator winding.

2. The information processing device according to claim 1, wherein the first magnetic interference model and the second magnetic interference model include model equations related to a magnetomotive force, in which the current in the rotor winding and the current in the stator winding are combined with a setting ratio.

3. The information processing device according to claim 2, wherein the setting ratio is 1:C, where C is a coefficient representing a degree of magnetic interference.

4. The information processing device according to claim 2, wherein the first magnetic interference model and the second magnetic interference model further include model equations representing a degree of change of the linkage magnetic flux by magnetic saturation.

5. The information processing device according to claim 1, wherein the first magnetic interference model and the second magnetic interference model have a model related to a d-axis linkage magnetic flux and a model related to a q-axis linkage magnetic flux.

6. The information processing device according to claim 1, wherein the current command value calculating unit calculates the current command value for the rotor winding and the current command value for the stator winding based on the evaluation function and a constraint condition including a condition that a voltage of the rotor winding is less than or equal to a first limit value and a voltage of the stator winding is less than or equal to a second limit value, and using the first magnetic interference model and the second magnetic interference model.

7. The information processing device according to claim 6, wherein electric power can be converted between an electricity storage device and the stator winding by a first electric power conversion device, electric power can be converted between the electricity storage device and the rotor winding by a second electric power conversion device, and the first limit value and the second limit value are set to values smaller than a voltage of the electricity storage device.

8. The information processing device according to claim 1, wherein the current command value calculating unit calculates the current command value for the rotor winding and the current command value for the stator winding based on the evaluation function and a constraint condition including a condition that the current in the rotor winding is less than or equal to a third limit value and the current in the stator winding is less than or equal to a fourth limit value, and using the first magnetic interference model and the second magnetic interference model.

9. The information processing device according to claim 8, wherein electric power can be converted between an electricity storage device and the stator winding by a first electric power conversion device, electric power can be converted between the electricity storage device and the rotor winding by a second electric power conversion device, the third limit value is set to a value smaller than a capacity of the second electric power conversion device, and the fourth limit value is set to a value smaller than a capacity of the first electric power conversion device.

10. The information processing device according to claim 1, wherein the current command value calculating unit calculates the current command value for the rotor winding and the current command value for the stator winding such that the evaluation function is approximately minimum.

11. An information storage device that stores the current command value for the rotor winding and the current command value for the stator winding calculated by the information processing device according to claim 1 in correspondence to the torque command value between the first rotor and the second rotor and the torque command value between the stator and the second rotor.

12. A control device of a rotary electric machine, that controls the current in the rotor winding and the current in the stator winding based on the current command value for the rotor winding and the current command value for the stator winding calculated by the information processing device according to claim 1.

* * * * *